(12) United States Patent
Kaneko

(10) Patent No.: US 11,444,536 B2
(45) Date of Patent: Sep. 13, 2022

(54) POWER SUPPLY SYSTEM, CONTROL DEVICE, AND METHOD FOR MEASURING REACTOR CURRENT

(71) Applicant: TOYOTA JIDOSHA KABUSHIKI KAISHA, Toyota (JP)

(72) Inventor: Tomohiko Kaneko, Ashigarakami-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 41 days.

(21) Appl. No.: 17/232,713

(22) Filed: Apr. 16, 2021

(65) Prior Publication Data

US 2021/0391791 A1    Dec. 16, 2021

(30) Foreign Application Priority Data

Jun. 11, 2020 (JP) .............................. JP2020-101831

(51) Int. Cl.
  *H02M 3/158* (2006.01)
  *H01F 27/42* (2006.01)
  (Continued)

(52) U.S. Cl.
  CPC ............ *H02M 3/158* (2013.01); *H01F 27/42* (2013.01); *H01F 27/427* (2013.01);
  (Continued)

(58) Field of Classification Search
  CPC ............ H02M 1/0003; H02M 1/0009; H02M 1/0025; H02M 1/0032; H02M 1/0043; H02M 1/0064; H02M 3/157; H02M 3/158; H02M 3/1584; H02M 3/1586; H01F 27/42; H01F 27/427
  See application file for complete search history.

(56) References Cited

U.S. PATENT DOCUMENTS 9,722,488 B2 * 8/2017 Ishizeki .................. H02M 1/14
2013/0176759 A1 7/2013 Kaneko
(Continued)

FOREIGN PATENT DOCUMENTS

JP    2006-087192 A    3/2006
JP    2006-087194 A    3/2006
(Continued)

*Primary Examiner* — Matthew V Nguyen
(74) *Attorney, Agent, or Firm* — Finnegan, Henderson, Farabow, Garrett & Dunner, LLP

(57) ABSTRACT

A controller of a power supply system includes a memory configured to store a self-inductance and a mutual inductance of two reactors included in a boost converter; and a processor configured to determine a present operating state of the boost converter, based on a ratio of an input voltage into the boost converter to an output voltage therefrom, a duty ratio applied to switching elements of the boost converter, the self-inductance, and the mutual inductance, the present operating state being one of operating states among which the waveform of a reactor current differs; and measure an average of the reactor current in a predetermined switching period of the switching elements, based on the input voltage, the output voltage, and the duty ratio, in accordance with the waveform of the reactor current corresponding to the present operating state of the boost converter.

6 Claims, 12 Drawing Sheets

(51) Int. Cl.
*H02M 1/00* (2006.01)
*H02M 3/157* (2006.01)
*H02M 1/08* (2006.01)

(52) U.S. Cl.
CPC ....... *H02M 1/0009* (2021.05); *H02M 1/0025* (2021.05); *H02M 1/08* (2013.01); *H02M 3/157* (2013.01); *H02M 1/0003* (2021.05); *H02M 3/1584* (2013.01); *Y02B 70/10* (2013.01)

(56) References Cited

U.S. PATENT DOCUMENTS

| | | | | |
|---|---|---|---|---|
| 2019/0173384 A1* | 6/2019 | Kutsuki | ............... | G01R 31/327 |
| 2020/0161974 A1* | 5/2020 | Tano | ................. | H01M 8/04917 |
| 2020/0180451 A1* | 6/2020 | Kawamura | ......... | H02M 3/1584 |

FOREIGN PATENT DOCUMENTS

| | | | | | |
|---|---|---|---|---|---|
| KR | 101232874 | * | 2/2013 | .............. | H02M 1/08 |
| WO | WO2013/098999 A1 | | 7/2013 | | |
| WO | WO-2017149776 A1 | * | 9/2017 | .............. | H02M 1/14 |

* cited by examiner

| OPERATING POINT | $V_L/V_H$ | D[%] | OPERATING STATE |
|---|---|---|---|
| 1 | 0.154 | 21 | 1 |
| 2 | 0.154 | 67 | 2 |
| 3 | 0.569 | 28 | 3 |
| 4 | 0.569 | 39 | 4 |
| 5 | 0.289 | 55 | 5 |
| 6 | 0.840 | 12 | 6 |

1400

POWER SUPPLY SYSTEM, CONTROL DEVICE, AND METHOD FOR MEASURING REACTOR CURRENT

FIELD

The present invention relates to a power supply system including a boost converter that boosts inputted direct-current power, a control device for controlling such a boost converter, and a method for measuring a reactor current flowing through a reactor included in the boost converter.

BACKGROUND

To boost direct-current power supplied from a direct-current power source, such as a fuel cell, a boost DC-DC converter (hereafter simply a "boost converter") is used in some cases. Such a boost converter includes, for example, a reactor and a switching element. Control of a duty ratio, which is a ratio of the period during which the switching element is ON to a switching period of the switching element, leads to control of a current flowing through the reactor (hereafter simply a "reactor current"), which results in control of a boost ratio of the voltage outputted from the boost converter to the voltage inputted thereinto. For this reason, appropriate control of the boost ratio requires precise measurement of a reactor current. To this end, a technique has been proposed to measure a reactor current of a boost converter (e.g., see International. Publication No. 2013/098999).

For example, a fuel cell system described in International Publication No. 2013/098999 includes a converter disposed between a fuel cell and a load to increase an output voltage of the fuel cell, and a control unit. The control unit determines a duty command value for the converter from a feedforward duty and a feedback duty that are calculated using a command value of a reactor current flowing through a reactor in the converter and/or using a measurement value of the reactor current. In low-load operation, the control unit uses, as a measurement value of the reactor current, a value obtained by multiplying a midpoint measurement value measured at an intermediate time of an on-duty period by a predetermined factor.

SUMMARY

When the boost converter operates in "discontinuous mode," in which no reactor current flows for some period in the switching period, as in low-load operation, the above-described technique replaces a measurement value of the reactor current with a value obtained by multiplying a midpoint measurement value of the reactor current by a predetermined factor. Thereby this technique aims at preventing a measurement value of the reactor current used for feedback control from deviating from an average of an actual current.

However, in a "magnetic-coupling boost converter." in which two reactors are disposed so that they can be magnetically coupled, the waveforms of reactor currents vary depending on the operating state of the boost converter even when the boost converter operates in discontinuous mode. Thus, a technique to accurately measure a reactor current of a magnetic-coupling boost converter is required.

It is an object of the present invention to provide a power supply system that can improve the accuracy of measurement of a reactor current of a magnetic-coupling boost converter.

According to an embodiment, a power supply system is provided. The power supply system includes a power source that supplies a direct-current power; a boost converter that boosts direct-current power supplied from the power source; a first voltmeter that measures an input voltage inputted into the boost converter; a second voltmeter that measures an output voltage outputted from the boost converter; and a control device that controls the boost converter. The boost converter includes a first reactor and a second reactor connected in parallel to the power source and being able to be magnetically coupled with each other; a first switching element connected to one end of the first reactor that is opposite to an end of the first reactor connected to the power source; and a second switching element connected to one end of the second reactor that is opposite to an end of the second reactor connected to the power source. The control device includes a memory configured to store a self-inductance of the first reactor and the second reactor and a mutual inductance between the first reactor and the second reactor; and a processor configured to switch between ON and OFF of the first switching element and the second switching element alternately at a predetermined duty ratio every predetermined switching period, determine a present operating state of the boost converter, based on a ratio of the input voltage to the output voltage, the duty ratio, the self-inductance, and the mutual inductance. The present operating state is one of operating states among which the waveform of a reactor current flowing through the first reactor or the second reactor in the switching period differs. The processor is further configured to measure an average of the reactor current in the switching period, based on the input voltage, the output voltage, and the duty ratio, in accordance with the waveform of the reactor current corresponding to the present operating state of the boost converter.

The power supply system preferably further includes an ammeter that measures the reactor current flowing through the first reactor. The memory of the control device preferably further stores, for each of the operating states of the boost converter, offset values respectively corresponding to combinations of the input voltage, the output voltage, and the duty ratio. Each of the offset values is a difference between a value of the reactor current at a predetermined timing in the switching period and the average of the reactor current. The processor of the control device preferably adds one of the offset values corresponding to a combination of the input voltage, the output voltage, and the duty ratio of the present operating state of the boost converter to a value of the reactor current measured at the predetermined timing to measure the average of the reactor current.

Alternatively, the memory of the control device of the power supply system preferably further stores, for each of the operating states of the boost converter, reference values of the average of the reactor current respectively corresponding to combinations of the input voltage, the output voltage, and the duty ratio. The processor of the control device preferably obtains, as the average of the reactor current, the reference value of the average of the reactor current corresponding to a combination of the input voltage, the output voltage, and the duty ratio of the present operating state of the boost converter.

In the power supply system, the waveform of the reactor current for each of the operating states of the boost converter depends on presence or absence of interaction between the first reactor and the second reactor and on increases or decreases in the reactor current depending on combinations of ON and OFF of the first switching element and the second switching element, the increases or decreases being caused by the interaction. The processor of the control device preferably determines whether determining conditions for occurrence of the respective waveforms of the reactor current for the respective operating states are satisfied, based on the ratio of the input voltage to the output voltage, the duty ratio, the self-inductance, and the mutual inductance, and determines an operating state whose determining condition is satisfied as the present operating state of the boost converter.

According to another embodiment, a control device for controlling a boost converter that boosts direct-current power supplied from a power source is provided. The boost converter controlled by the control device includes a first reactor and a second reactor connected in parallel to the power source and being able to be magnetically coupled with each other; a first switching element connected to one end of the first reactor that is opposite to an end of the first reactor connected to the power source; and a second switching element connected to one end of the second reactor that is opposite to an end of the second reactor connected to the power source. The control device includes a memory configured to store a self-inductance of the first reactor and the second reactor and a mutual inductance between the first reactor and the second reactor, and a processor configured to switch between ON and OFF of the first switching element and the second switching element alternately at a predetermined duty ratio every predetermined switching period, determine a present operating state of the boost converter, based on a ratio of an input voltage into the boost converter to an output voltage from the boost converter, the duty ratio, the self-inductance, and the mutual inductance. The input voltage and the output voltage are measured with a first voltmeter and a second voltmeter, respectively, and the present operating state is one of operating states among which the waveform of a reactor current flowing through the first reactor or the second reactor in the switching period differs. The processor is further configured to measure an average of the reactor current in the switching period, based on the input voltage, the output voltage, and the duty ratio, in accordance with the waveform of the reactor current corresponding to the present operating state of the boost converter.

According to another modified example of the present invention, a method for measuring a reactor current in a boost converter including a first reactor, a second reactor, a first switching element, and a second switching element is provided. The first reactor and the second reactor are connected in parallel to a direct-current power source and able to be magnetically coupled with each other. The first switching element is connected to one end of the first reactor that is opposite to an end of the first reactor connected to the power source, and the second switching element is connected to one end of the second reactor that is opposite to an end of the second reactor connected to the power source. The reactor current flows through the first reactor or the second reactor. The method includes obtaining a value of an input voltage inputted into the boost converter, the value being measured with a first voltmeter; obtaining a value of an output voltage outputted from the boost converter, the value being measured with a second voltmeter, and determining a present operating state of the boost converter, based on a ratio of the input voltage to the output voltage, a predetermined duty ratio, a self-inductance of the first reactor and the second reactor, and a mutual inductance between the first reactor and the second reactor. ON and OFF of the first switching element and the second switching element are switched alternately at the duty ratio during a predetermined switching period, and the present operating state is one of operating states among which the waveform of the reactor current in the switching period differs. The method further includes measuring an average of the reactor current in the switching period, based on the input voltage, the output voltage, and the duty ratio, in accordance with the waveform of the reactor current corresponding to the present operating state of the boost converter.

The power supply system according to the present invention has an advantageous effect of being able to improve the accuracy of measurement of a reactor current of a magnetic-coupling boost converter.

DESCRIPTION OF EMBODIMENTS

Hereinafter, a power supply system that includes a boost converter, a control device that controls the boost converter, and a reactor-current measuring process to be performed in the power supply system will be described with reference to the accompanying drawings. The power supply system includes a magnetic-coupling boost converter, and measures reactor currents flowing through two reactors included in the boost converter. To this end, the power supply system measures the voltage inputted into the boost converter (hereafter simply the "input voltage") and the voltage outputted from the boost converter (hereafter simply the "output voltage"). The power supply system then determines the present operating state of the boost converter, which is one of operating states among which the waveform of each reactor current differs, based on the ratio of the measurement value of the input voltage to that of the output voltage, the duty ratios of switching elements included in the boost converter, and the self-inductances and the mutual inductance of the reactors. The power supply system then measures averages of the respective reactor currents in the switching period of the switching elements included in the boost converter in accordance with the waveforms of the reactor currents corresponding to the determined operating state.

Figure 1:
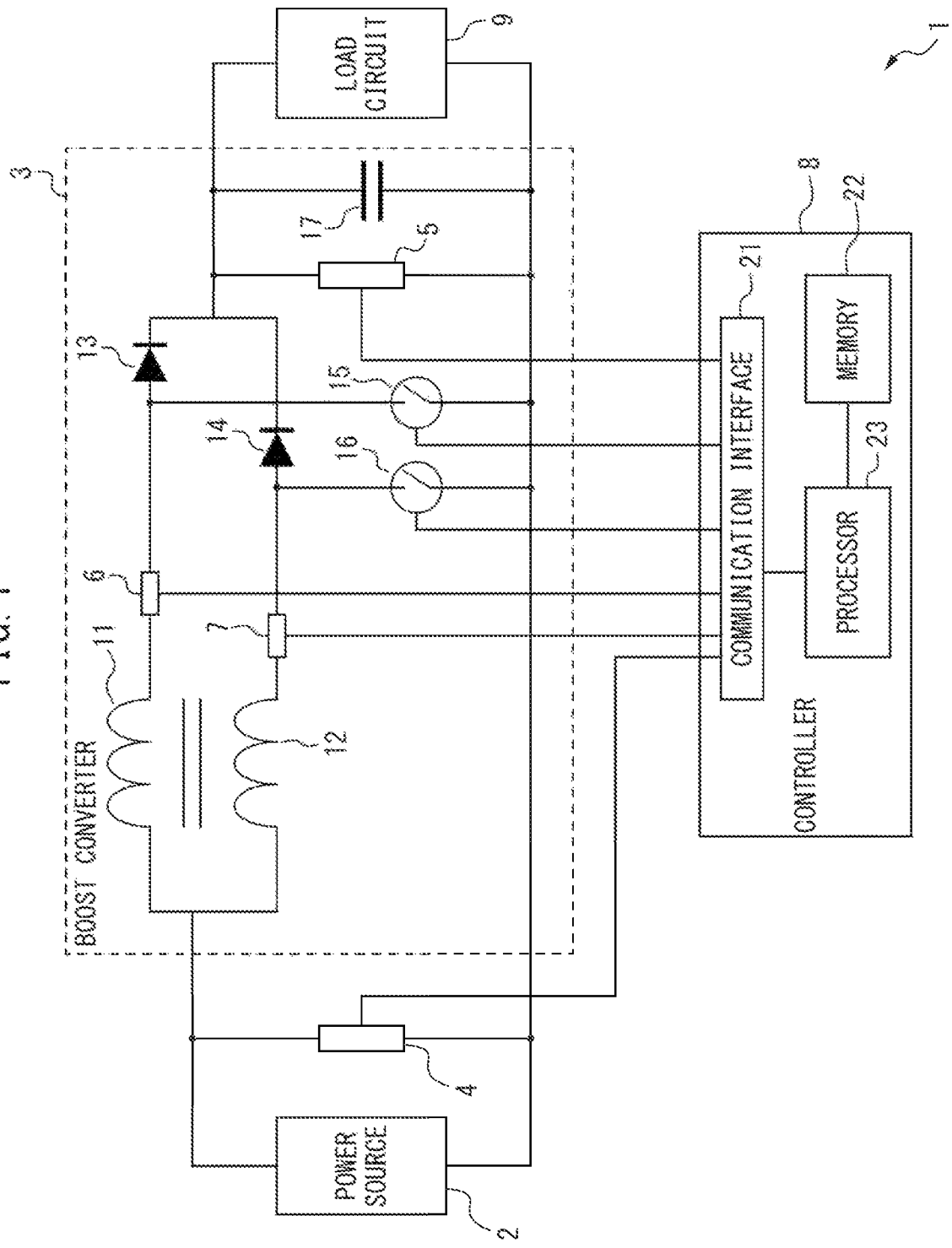
FIG. 1 schematically illustrates the configuration of a power supply system according to an embodiment.

FIG. 1 schematically illustrates the configuration of a power supply system according to an embodiment. As illustrated in FIG. 1, the power supply system 1 includes a power source 2, a boost converter 3, two voltmeters 4 and 5, two ammeters 6 and 7, and a controller 8. The power supply system 1 uses the boost converter 3 to boost direct-current power supplied from the power source 2, and supplies the boosted direct-current power to a load circuit 9. The power source 2 is connected with the single boost converter 3 in the example illustrated in FIG. 1, but may be connected with multiple boost converters in parallel. The controller 8 may control these boost converters. In this case, two voltmeters and two ammeters are connected to every boost converter, as illustrated in FIG. 1.

The power source 2 is a direct-current power source, and may be a fuel cell in the present embodiment. The power source 2 is not limited to a fuel cell, and may be a different type of direct-current power source, such as a lead storage battery or a lithium-ion battery. The direct-current power supplied from the power source 2 is inputted into the boost converter 3.

The boost converter 3 is a "magnetic-coupling boost converter." boosts the direct-current power supplied from the power source 2, and outputs the boosted direct-current power to the load circuit 9. To this end, the boost converter 3 includes two reactors 11 and 12, two diodes 13 and 14, two switching elements 15 and 16, and a smoothing capacitor 17.

The two reactors 11 and 12 are connected in parallel between the power source 2 and the load circuit 9, and disposed so that they can be magnetically coupled. For example, the reactor 11 (first reactor) and the reactor 12 (second reactor) are wound around the same core. The reactors 11 and 12 may have the same configuration (e.g., winding number). In other words, the reactors 11 and 12 may have the same self-inductance.

The diode 13 is disposed between the reactor 11 and the smoothing capacitor 17 with the anode and cathode thereof connected to one end of the reactor 11 and to one end of the smoothing capacitor 17, respectively. In other words, the diode 13 is disposed so that a reactor current may flow from the reactor 11 toward the smoothing capacitor 17. Similarly, the diode 14 is disposed between the reactor 12 and the smoothing capacitor 17 with the anode and cathode thereof connected to one end of the reactor 12 and to the one end of the smoothing capacitor 17, respectively. In other words, the diode 14 is disposed so that a reactor current may flow from the reactor 12 toward the smoothing capacitor 17.

Each of the two switching elements 15 and 16 may be, for example, a semiconductor switching element, such as a MOSFET or an insulated-gate bipolar transistor. The switching element 15 (first switching element) is connected to the one end of the reactor 11 that is opposite to an end of the reactor 11 connected to the power source 2. More specifically, the switching element 15 is disposed, with one end thereof connected between the reactor 11 and the diode 13 and the other end thereof grounded, so as to switch between ON and OFF in accordance with a control signal from the controller 8. Similarly, the switching element 16 (second switching element) is connected to the one end of the reactor 12 that is opposite to an end of the reactor 12 connected to the power source 2. More specifically, the switching element 16 is disposed, with one end thereof connected between the reactor 12 and the diode 14 and the other end thereof grounded, so as to switch between ON and OFF in accordance with a control signal from the controller 8. When the controller 8 turns on the switching element 15, energy is accumulated in the reactor 11 by a reactor current flowing through the reactor 11 via the switching element 15. When the controller 8 turns off the switching element 15, a reactor current caused by the energy accumulated in the reactor 11 flows to the smoothing capacitor 17. Similarly, when the controller 8 turns on the switching element 16, energy is accumulated in the reactor 12 by a reactor current flowing through the reactor 12 via the switching element 16. When the controller 8 turns off the switching element 16, a reactor current caused by the energy accumulated in the reactor 12 flows to the smoothing capacitor 17.

The smoothing capacitor 17 smoothes electric power accumulated by the reactor currents flowing from the reactors 11 and 12, and outputs it to the load circuit 9. Thus, periodic switching between ON and OFF of the switching elements 15 and 16 performed by the controller 8 increases the electric power accumulated in the smoothing capacitor 17, causing the direct-current power supplied to the boost converter 3 to be boosted and then outputted therefrom.

The voltmeter 4, which is an example of the first voltmeter, is disposed between the power source 2 and the boost converter 3 and measures the voltage inputted into the boost converter 3. The voltmeter 4 outputs the measurement value of the input voltage to the controller 8.

The voltmeter 5, which is an example of the second voltmeter, is disposed between the diodes 13 and 14 and the smoothing capacitor 17 and measures the voltage outputted from the boost converter 3. The voltmeter 5 may be disposed between the smoothing capacitor 17 and the load circuit 9. The voltmeter 5 outputs the measurement value of the output voltage to the controller 8.

The ammeter 6 is disposed between the reactor 11 and the diode 13 closer to the reactor 11 than the connection point of the switching element 15, and measures the reactor current flowing through the reactor 11. The ammeter 6 outputs the measurement value of the reactor current to the controller 8. Similarly, the ammeter 7 is disposed between the reactor 12 and the diode 14 closer to the reactor 12 than the connection point of the switching element 16, measures the reactor current flowing through the reactor 12, and outputs the measurement value of the reactor current to the controller 8.

The controller 8, which is an example of the control unit, controls the overall operation of the power supply system 1 including the boost converter 3. More specifically, the controller 8 determines a current command value for the boost converter 3, based on a target value of the electric power supplied from the power source 2 (hereafter simply a "target power value"), and sets duty ratios of the two switching elements 15 and 16, depending on the determined current command value. The target power value is received from another device, e.g., a controller of an apparatus into which the power supply system 1 is embedded. The controller 8 then alternately switches between ON and OFF of the two switching elements 15 and 16 at the duty ratios every predetermined switching period. In addition, the controller 8 measures averages of the respective reactor currents in the switching period of the switching elements, based on measurement values of the voltages inputted into and outputted from the boost converter 3, measurement values of the reactor currents, the self-inductances of the two reactors 11 and 12 of the boost converter 3, the mutual inductance between the two reactors, and the duty ratios, and modifies the duty ratios, depending on the measured averages of the reactor currents.

To this end, the controller 8 includes a communication interface 21, a memory 22, and a processor 23. The communication interface 21, the memory 22, and the processor 23 may be separate circuits or a single integrated circuit.

The communication interface 21 includes an interface circuit for connecting the two voltmeters 4 and 5, the two ammeters 6 and 7, and another device to the controller 9, and a gate driver for outputting control signals to the two switching elements 15 and 16 of the boost converter 3. The communication interface 21 receives measurement values of the voltages inputted into and outputted from the boost converter 3 from the voltmeters 4 and 5, respectively, receives measurement values of the reactor currents from the ammeters 6 and 7, respectively, and passes these measurement values to the processor 23. The communication interface 21 outputs control signals received from the processor 23 to the two switching elements 15 and 16 of the boost converter 3. In addition, the communication interface 21 passes a target power value received from another device to the processor 23. Additionally, the communication interface 21 may receive information indicating averages of the respective reactor currents in the switching period from the processor 23, and output them to another device.

The memory 22, which is an example of the storage unit, includes, for example, nonvolatile and volatile semiconductor memories. The memory 22 stores various types of information used for controlling the power supply system 1. For example, the memory 22 stores a table indicating a correspondence between current command values and duty ratios, and various types of information used for estimating averages of the respective reactor currents in the switching period of the switching elements of the boost converter 3, e.g., the self-inductances of the two reactors 1l and 12 of the boost converter 3, the mutual inductance between the reactors 11 and 12, and the length of the switching period of the switching elements. Additionally, the memory 22 temporarily stores various types of data calculated by the processor 23 while the power supply system 1 is operating.

The processor 23 includes, for example, one or more operating circuits and a peripheral circuit thereof. The processor 23 sets duty ratios of the switching elements of the boost converter 3, and alternately switches between ON and OFF of the switching elements at these duty ratios every switching period. Additionally, the processor 23 measures averages of the respective reactor currents in the switching period of the switching elements of the boost converter 3, and modifies the duty ratios, depending on the measured averages of the reactor currents.

Figure 2:
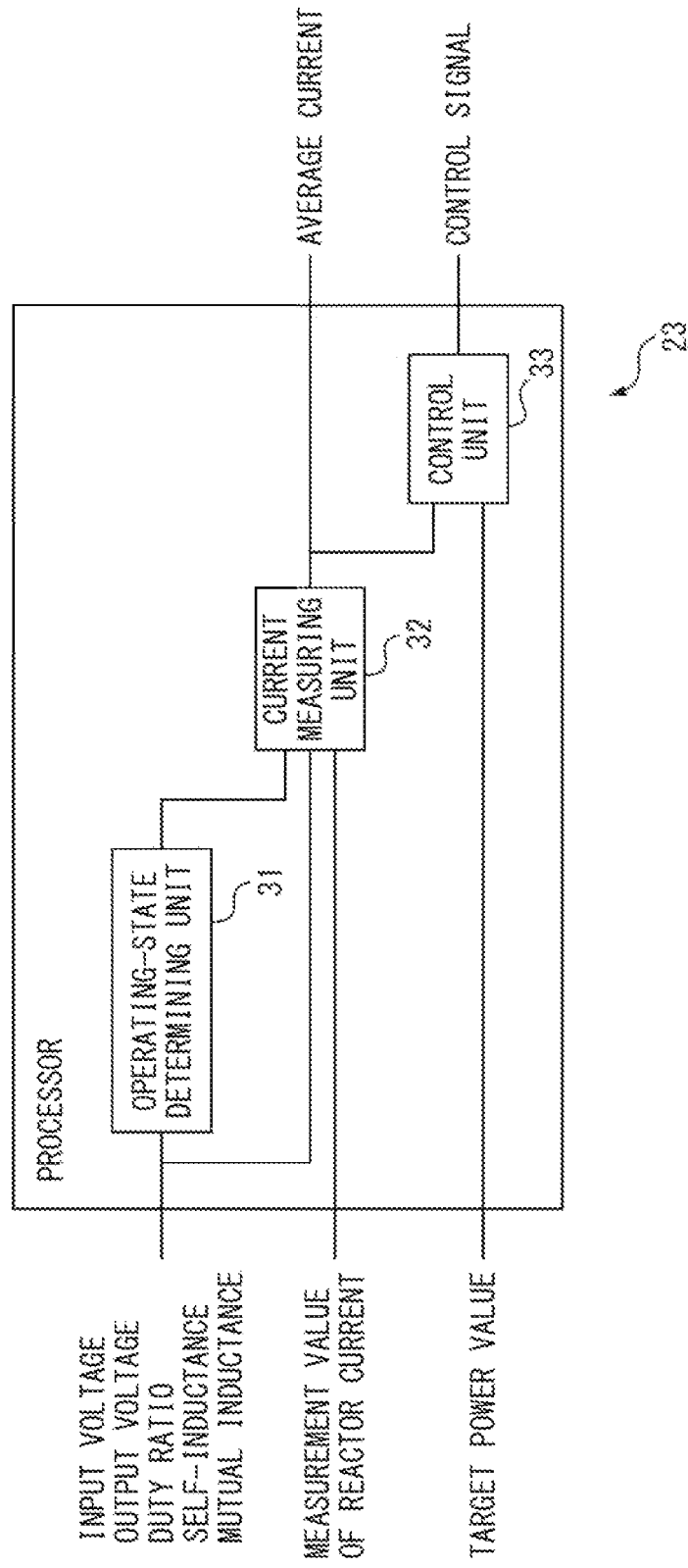
FIG. 2 is a functional block diagram of a processor of a controller, related to a process to control a boost converter including a reactor-current measuring process.

FIG. 2 is a functional block diagram of the processor 23, related to a process to control the boost converter 3 including a reactor-current measuring process. The processor 23 includes an operating-state determining unit 31, a current measuring unit 32, and a control unit 33.

The operating-state determining unit 31 determines the operating state of the boost converter 3 every predetermined period, e.g., every switching period of one of the switching elements of the boost converter 3. In the present embodiment, the operating-state determining unit 31 determines the present operating state of the boost converter 3, which is one of operating states among which the waveform of each reactor current in the switching period differs, based on the ratio of a measurement value of the input voltage into the boost converter 3 to a measurement value of the output voltage from the boost converter 3, the self-inductances and the mutual inductance of the reactors of the boost converter 3, and the duty ratios of the switching elements.

When the boost converter 3 operates in continuous mode, in which the switching period does not include a period during which no reactor current flows, the waveforms of the reactor currents flowing through the respective reactors of the boost converter 3 are triangular waves that linearly rise and fall in a repeated manner every switching period of the switching elements. Thus, for each of the reactors 11 and 12, the value of the reactor current measured at the timing corresponding to the midpoint of the period during which the corresponding switching element is ON is assumed to be the average of the reactor current flowing through the reactor in the switching period. However, when the boost converter 3 operates in discontinuous mode, in which no reactor current flows for some period, the averages of the reactor currents in the switching period vary depending on the waveforms of the reactor currents in the switching period. Additionally, the waveforms of the reactor currents in the switching period vary depending on the operating state, which depends on the presence or absence of interaction between the reactors 11 and 12 and, if any, the degree of interaction therebetween.

The waveforms of the reactor currents for the respective operating states of the boost converter 3 can be obtained by solving a circuit equation of the boost converter. The following describes an equivalent circuit and a circuit equation of the boost converter 3.

Figure 3:
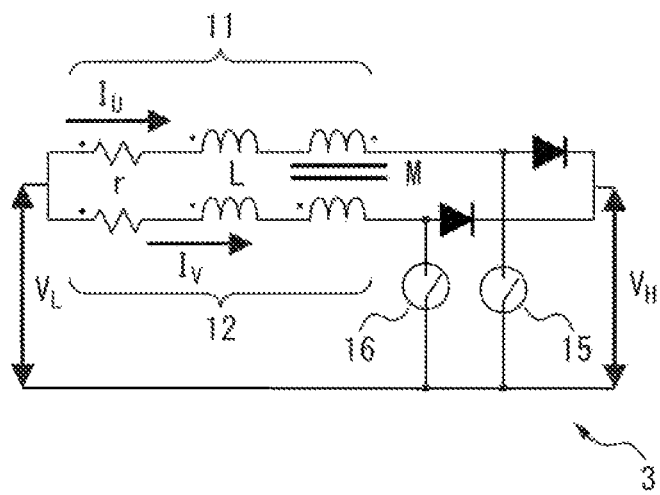
FIG. 3 illustrates an equivalent circuit of the boost converter.

FIG. 3 illustrates an equivalent circuit of the boost converter 3. As illustrated in FIG. 3, in the equivalent circuit of the boost converter 3, the reactor 11 is regarded as a series connection of a resistance r, a self-inductance L, and a mutual inductance M. Similarly, the reactor 12 is also regarded as a series connection of a resistance r, a self-inductance L, and a mutual inductance M. The reactors 11 and 12 are assumed to have the same circuit constants. The side connected with the reactor 11 and the side connected with the reactor 12 will be referred to as "U-phase" and "V-phase," respectively. A reactor current flowing through the reactor 11, a reactor current flowing through the reactor 12, and a voltage vector will be denoted by $I_U$, $I_V$, and V, respectively. Then, the circuit equation of the boost converter 3 is expressed by the following equations.

$$\frac{dI}{dt} = \frac{1}{(L^2 - M^2)}\begin{pmatrix} L & M \\ M & L \end{pmatrix}(V - rI) \quad (1)$$

$$I = \begin{pmatrix} I_U \\ I_V \end{pmatrix}$$

The voltage vector V takes values pursuant to the following table. The input voltage into the boost converter 3 and the output voltage therefrom are denoted by $V_L$ and $V_H$, respectively. The same holds true for the following description. "U-phase ON" means that the switching element 15 connected to the reactor 11 is turned on, and "U-phase OFF" means that the switching element 15 is turned off. Similarly, "V-phase OFF" means that the switching element 16 connected to the reactor 12 is turned on, and "V-phase OFF" means that the switching element 16 is turned off. In the following, turn-on and turn-off of the U-phase switching element 15 will be simply referred to as turn-on and turn-off of the U-phase, respectively, for convenience of description. Similarly, turn-on and turn-off of the V-phase switching element 16 will be simply referred to as turn-on and turn-off of the V-phase, respectively.

TABLE 1

Values taken by voltage vector

| voltage vector V | U-phase ON | U-phase OFF |
|---|---|---|
| V-phase ON | $V \equiv \begin{pmatrix} V_L \\ V_L \end{pmatrix}$ | $V \equiv \begin{pmatrix} V_L - V_H \\ V_L \end{pmatrix}$ |
| V-phase OFF | $V \equiv \begin{pmatrix} V_L \\ V_L - V_H \end{pmatrix}$ | $V \equiv \begin{pmatrix} V_L - V_H \\ V_L - V_H \end{pmatrix}$ |

In the present embodiment, the self-inductance L of the reactors is assumed to be greater than the mutual inductance M thereof. The controller 8 is assumed to control the switching elements so that the U-phase and the V-phase will operate symmetrically. More specifically, assume that the switching period and the duty ratio of the U-phase switching element 15 are the same as those of the V-phase switching element 16, and that the timing when the U-phase switches from OFF to ON is shifted by ½ of the switching period from the timing when the V-phase switches from OFF to ON.

The operating states of the boost converter 3 operating in discontinuous mode include an operating state in which a period during which a reactor current flows through the U-phase and a period during which a reactor current flows through the V-phase do not overlap and the U-phase and the V-phase do not interact; and operating states in which these periods overlap and the U-phase and the V-phase interact. Additionally, the operating states in which the U-phase and the V-phase interact include multiple operating states among which timings of increases or decreases in the reactor currents depending on combinations of ON and OFF of the U-phase and the V-phase differ, i.e., the waveforms of the reactor currents differ. In other words, the waveforms of the reactor currents for each of the operating states depend on the presence or absence of interaction between the U-phase reactor 11 and the V-phase reactor 12 and on increases or decreases in the reactor currents, which are caused by this interaction, depending on combinations of ON and OFF of the switching elements 15 and 16. Thus, each operating state has a determining condition for occurrence of the waveforms of the reactor currents for the operating state.

This point will now be described in detail. Since the U-phase and the V-phase operate symmetrically as described above, the following description will focus on the U-phase.

According to equations (1) and Table 1, the circuit equation of the boost converter 3 related to the U-phase for the case that both the U-phase and the V-phase are ON is expressed by the following equation.

$$\frac{dI_U}{dt} = \frac{1}{(L^2 - M^2)}(L + M)V_L \quad (2)$$

Since the self-inductance L is greater than the mutual inductance M according to the definition, the right side of equation (2) is constantly positive. Hence, when both the U-phase and the V-phase are ON, the rate of change dI/dt in the U-phase reactor current (hereafter simply the "U-phase current") is constantly positive. In other words, when both the U-phase and the V-phase are ON, the U-phase current increases with the passage of time (This will be simply refers to as an "increase in current" below. The same holds true for the V-phase.).

According to equations (1) and Table 1, the circuit equation of the boost converter 3 related to the U-phase for the case that both the U-phase and the V-phase are OFF is expressed by the following equation.

$$\frac{dI_U}{dt} = \frac{1}{(L^2 - M^2)}(L + M)(V_L - V_H) \quad (3)$$

Since the self-inductance L is greater than the mutual inductance M and the output voltage $V_H$ is higher than the input voltage $V_L$ as described above, the right side of equation (3) is constantly negative. Hence, when both the U-phase and the V-phase are OFF, the rate of change dI/dt in the U-phase current is constantly negative. In other words, when both the U-phase and the V-phase are OFF, the U-phase current decreases with the passage of time (This will be simply refers to as a "decrease in current" below. The same holds true for the V-phase.). In view of these, possible combinations of ON and OFF of the phases and increases and decreases in the U-phase current for the case that the U-phase and the V-phase interact are as illustrated in the following Tables 2 to 5.

TABLE 2

Increases and decreases in U-phase current in interaction state I

| $dI_u/dt$ | U-phase ON | U-phase OFF |
|---|---|---|
| V-phase ON | constantly positive | negative |
| V-phase OFF | negative | constantly negative |

TABLE 3

Increases and decreases in U-phase current in interaction state II

| $dI_u/dt$ | U-phase ON | U-phase OFF |
|---|---|---|
| V-phase ON | constantly positive | negative |
| V-phase OFF | positive | constantly negative |

TABLE 4

Increases and decreases in U-phase current in interaction state III

| $dI_u/dt$ | U-phase ON | U-phase OFF |
|---|---|---|
| V-phase ON | constantly positive | positive |
| V-phase OFF | negative | constantly negative |

TABLE 5

Increases and decreases in U-phase current in interaction state IV

| $dI_u/dt$ | U-phase ON | U-phase OFF |
|---|---|---|
| V-phase ON | constantly positive | positive |
| V-phase OFF | positive | constantly negative |

More specifically, in the operating state illustrated in Table 2, the U-phase current increases only in the case that both the U-phase and the V-phase are ON, and decreases in the other cases. For the sake of convenience, this operating state will be referred to as "interaction state I." According to equations (1), interaction state I occurs only when the ratio $V_L/V_H$ of the input voltage to the output voltage is less than M/(L+M). In the operating state illustrated in Table 3, when the U-phase is ON, the U-phase current increases regardless of whether the V-phase is ON or OFF, but when the U-phase is OFF, the U-phase current decreases regardless of whether the V-phase is ON or OFF. For the sake of convenience, this operating state will be referred to as "interaction state II." According to equations (1), interaction state II occurs only when the ratio $V_L/V_H$ of the input voltage to the output voltage is not less than M/(L+M) and less than L/(L+M). In the operating state illustrated in Table 4, when the V-phase is ON, the U-phase current increases regardless of whether the U-phase is ON or OFF, but when the V-phase is OFF, the U-phase current decreases regardless of whether the U-phase is ON or OFF. For the sake of convenience, this operating state will be referred to as "interaction state U." As will be described in detail below, the operating state of the boost converter 3 does not become interaction state III. In the operating state illustrated in Table 5, the U-phase current decreases only in the case that both the U-phase and the V-phase are OFF, and increases in the other cases. For the sake of convenience, this operating state will be referred to as "interaction state IV." According to equations (1), interaction state IV occurs only when the ratio $V_L/V_H$ of the input voltage to the output voltage is not less than L/(L+M).

The following describes, for each operating state, a determining condition for occurrence of the operating state (i.e., a determining condition for occurrence of the waveforms of the reactor currents for the operating state) and the relationship between the waveforms of the reactor currents for the operating state and the average of a current in the switching period.

Figure 4:
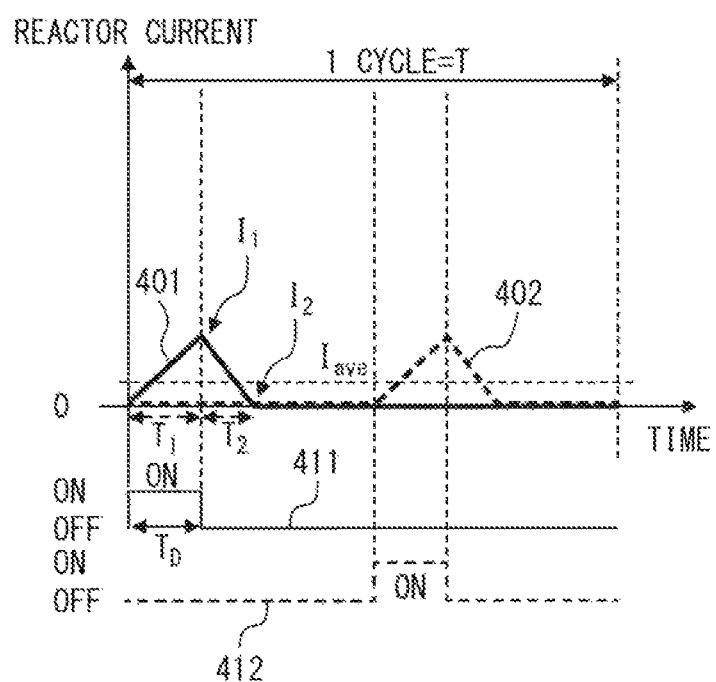
FIG. 4 illustrates an example of the waveforms of reactor currents for one of operating states in which the boost converter operates in discontinuous mode.

FIG. 4 illustrates an example of the waveforms of the reactor currents for the case that the U-phase and the V-phase do not interact. In FIG. 4, the abscissa, the ordinate in the upper part, and the ordinate in the lower part represent time, the magnitude of the reactor currents, and the states (ON or OFF) of the switching elements, respectively. Waveforms 401 and 402 represent the waveform of the U-phase current and that of the V-phase reactor current (hereafter simply the "V-phase current"), respectively. Waveforms 411 and 412 represent the change in state of the U-phase switching element 15 and that of the V-phase switching element 16, respectively.

As illustrated in FIG. 4, in the case that the U-phase and the V-phase do not interact, the U-phase current increases while the U-phase is ON, and decreases after the U-phase is turned off. The V-phase current similarly increases and decreases while the U-phase current is zero. Thus, in this case, the average $I_{ave}$ of the U-phase current in the switching period (hereafter simply the "average of the U-phase current" or the "average current") is calculated, on the assumption that the mutual inductance M is zero in equations (1), by dividing the switching period into sub-periods during which the U-phase current linearly increases or decreases and measuring the U-phase current at the ending points of these sub-periods. For each operating state described below, the U-phase average current $I_{ave}$ is similarly calculated by dividing the switching period into sub-periods during which the U-phase current linearly increases or decreases and measuring the U-phase current at the ending points of these sub-periods. More specifically, in the operating state in which the U-phase and the V-phase do not interact, the U-phase average current $I_{ave}$ is calculated in accordance with the following equations.

$$I_{ave} = \frac{1}{T}\left(\frac{1}{2}I_1 T_1 + \frac{1}{2}I_2 T_2\right) \quad (4)$$

$$I_1 = \frac{V_L}{L}T_1, \quad I_2 = I_1 + \frac{(V_L - V_H)}{L}T_2 = 0$$

$$T_1 = T_D, \quad T_2 = \frac{V_L}{(V_H - V_L)}T_D$$

T denotes the length of the switching period, and $T_D$ denotes the length of the period, in the switching period, during which the U-phase switching element 15 is ON. T, denotes the length of the period during which the U-phase current increases. In this example, $T_1=T_D$. $T_2$ denotes the length of the period during which the U-phase current decreases. $I_1$ denotes the U-phase current at turn-off of the U-phase, i.e., at the time after the elapse of the period $T_1$ from the start of the switching period T, and $I_2$ denotes the U-phase current at the time after the elapse of the period $T_2$ from the turn-off of the U-phase. More specifically, $I_2=0$. This operating state occurs when $(T_1+T_2) \leq T/2$. Hence the determining condition for this operating state is expressed by the following equation:

$$0 < D \leq \frac{1}{2}\left(1 - \frac{V_L}{V_H}\right) \quad (5)$$

where D is the duty ratio. Thus, the operating-state determining unit 31 determines whether the condition expressed by (5) is satisfied, based on the ratio $(V_L/V_H)$ of the input voltage VT to the output voltage $V_H$ and the duty ratio D. When this condition is satisfied, the operating-state determining unit 31 may determine that the operating state of the boost converter 3 is one in which it operates in discontinuous mode and the U-phase and the V-phase do not interact.

The following describes interaction state I. Interaction state I is classified into the case in which the duty ratio D is greater than ½ and the U-phase current becomes zero while the U-phase is ON, and the case in which the duty ratio D is greater than ½ and the U-phase current does not become zero while the U-phase is ON. In interaction state I, there is no case in which the duty ratio D is ½ or less. This is because, if the duty ratio D is ½ or less, there is no period during which both the U-phase and the V-phase are ON according to the definition of interaction state I, resulting in the U-phase current decreasing constantly. The individual cases will be described in sequence.

Figure 5:
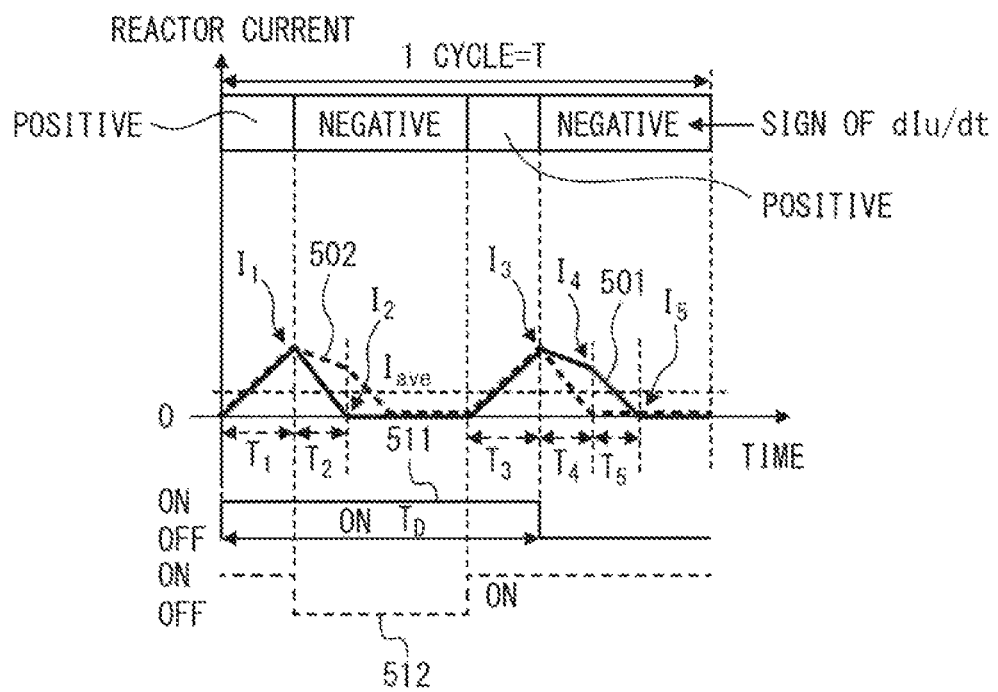
FIG. 5 illustrates an example of the waveforms of reactor currents for another one of operating states in which the boost convener operates in discontinuous mode.

FIG. 5 illustrates an example of the waveforms of the reactor currents for the case that the operating state is interaction state I, the duty ratio D is greater than ½, and the U-phase current becomes zero while the U-phase switching element 15 is ON. In FIG. 5, the abscissa, the ordinate in the upper part, and the ordinate in the lower part represent time, the magnitude of the reactor currents, and the states (ON or OFF) of the switching elements, respectively. Waveforms 501 and 502 represent the waveform of the U-phase current and that of the V-phase current, respectively. Waveforms 511 and 512 represent the change in state of the U-phase switching element 15 and that of the V-phase switching element 16, respectively.

As illustrated in FIG. 5, both the U-phase and the V-phase are ON from the start of the switching period T until after the elapse of a period $T_1$, causing the U-phase current to increase. When the period $T_1$ has elapsed, the V-phase is turned off and then the V-phase current starts decreasing. In interaction state I, turn-off of the U-phase or the V-phase causes the U-phase current to decrease. In other words, the decrease in the V-phase current affects the U-phase reactor, and thereby the U-phase current also decreases. After the elapse of a period $T_2$ from the end of the period $T_1$, the U-phase current becomes zero. Then, after the elapse of T/2 from the start of the switching period, the V-phase is turned on, and thereafter both the V-phase and the U-phase currents increase because both the U-phase and the V-phase are ON. After the elapse of a period $T_3$ from the turn-on of the V-phase, the U-phase is turned off, and thereafter both the U-phase and V-phase currents decrease. After the elapse of a period $T_4$ from the turn-off of the U-phase, the V-phase current becomes zero, and thereafter the U-phase current decreases more rapidly. After the elapse of a period $T_5$ from when the V-phase current becomes zero, the U-phase current also becomes zero. Thus, the U-phase currents $I_1$ to $I_5$ at the ending points of the periods $T_1$ to $T_5$ and the lengths of the periods $T_1$ to $T_5$ are expressed by the following equations.

$$I_1 = \frac{1}{(L^2 - M^2)}(L+M)V_L T_1 \quad (6)$$

$$I_2 = I_1 + \frac{(LV_1 + MV_L - MV_H)}{(L^2 - M^2)}T_2$$

$$I_3 = I_2 + \frac{(L+M)V_L}{(L^2 - M^2)}T_3$$

$$I_4 = I_3 + \frac{1}{(L^2 - M^2)}(LV_L - LV_H + MV_L)T_4$$

$$I_5 = I_4 + \frac{(V_L - V_H)}{L}T_5 = 0$$

$$T_1 = T_3 = T_D - \frac{T}{2}$$

-continued $$T_2 = T_4$$

$$\therefore T_2 = -\frac{(L+M)V_L}{LV_L + MV_L - MV_H}T_1$$

$$\therefore T_5 = \frac{L\{(L+M)V_L T_1 + (LV_L - LV_H + MV_L)T_2\}}{(L^2 - M^2)(V_H - V_L)}$$

Hence the U-phase average current $I_{ave}$ for this operating state is calculated in accordance with the following equation.

$$I_{ave} = \frac{1}{T}\left(\frac{1}{2}I_1 T_1 + \frac{1}{2}I_1 T_2 + \frac{1}{2}I_3 T_3 + \frac{1}{2}(I_3 + I_4)T_4 + \frac{1}{2}I_4 T_5\right) \quad (7)$$

The determining condition for this operating state is expressed by the following equations.

$$T_4 + T_5 \leq T - T_d \Leftrightarrow D \leq 1 - \frac{V_L}{2V_H} \quad (8)$$

$$T_2 > 0$$

$$T_5 > 0$$

However, in order for the period $T_5$ to be positive, equations (6) require that the self-inductance L be less than the mutual inductance M which contradicts the precondition. Therefore there is no case in which the operating state is interaction state I, the duty ratio D is greater than ½, and the U-phase current becomes zero while the U-phase is ON. In other words, the operating-state determining unit 31 does not determine that the operating state of the boost converter 3 is this case.

Figure 6:
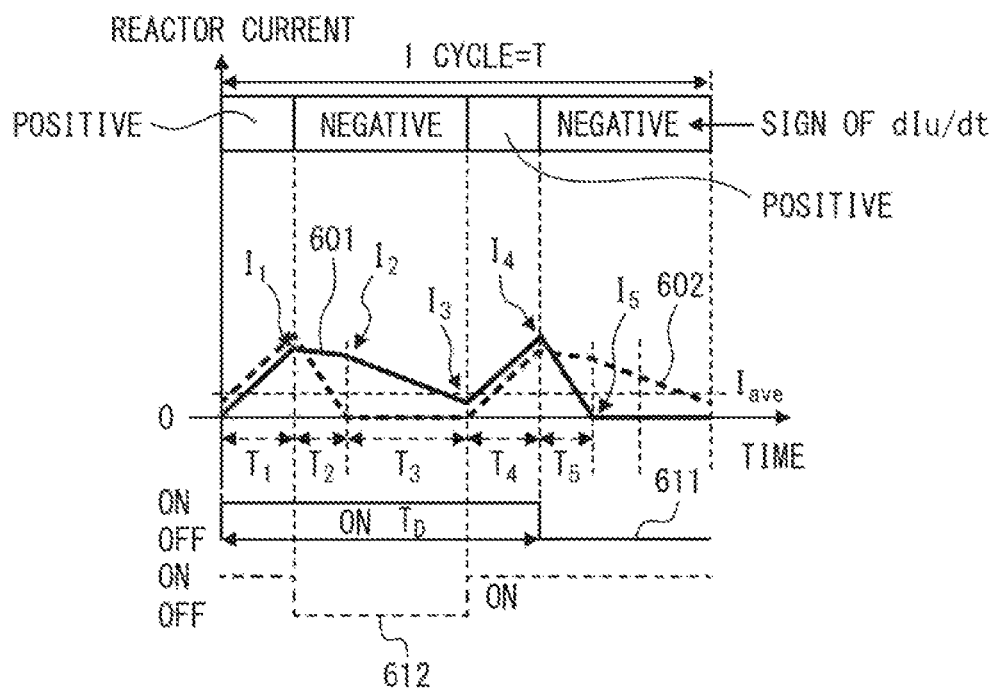
FIG. 6 illustrates an example of the waveforms of reactor currents for still another one of operating states in which the boost converter operates in discontinuous mode.

FIG. 6 illustrates an example of the waveforms of the reactor currents for the case that the operating state is interaction state I, the duty ratio D is greater than ½, and the U-phase current does not become zero while the U-phase is ON. In FIG. 6, the abscissa, the ordinate in the upper part, and the ordinate in the lower part represent time, the magnitude of the reactor currents, and the states (ON or OFF) of the switching elements, respectively. Waveforms 601 and 602 represent the waveform of the U-phase current and that of the V-phase current, respectively. Waveforms 611 and 612 represent the change in state of the U-phase switching element 15 and that of the V-phase switching element 16, respectively.

As illustrated in FIG. 6, both the U-phase and the V-phase are ON from the start of the switching period T until after the elapse of a period $T_1$, causing the U-phase current to increase. When the period $T_1$ has elapsed, the V-phase is turned off and then the V-phase current starts decreasing. In interaction state I, turn-off of the U-phase or the V-phase causes the U-phase current to decrease, as described above. In other words, the decrease in the V-phase current affects the U-phase reactor, and thereby the U-phase current also decreases. After the elapse of a period $T_2$ from the end of the period $T_1$, the V-phase current becomes zero. Thereafter, the decrease in the U-phase current slows down. After the elapse of a period $T_4$ from when the V-phase current becomes zero, i.e., after the elapse of T/2 from the start of the switching period, the V-phase is turned on, and then both the V-phase and the U-phase currents increase because both the U-phase and the V-phase are ON. After the elapse of a period $T_4$ from the turn-on of the V-phase, the U-phase is turned off, and thereafter the U-phase and V-phase currents decrease. After the elapse of a period $T_5$ from the turn-off of the U-phase, the U-phase current becomes zero. Thus, the U-phase currents $I_1$ to $I_5$ at the ending points of the periods $T_1$ to $T_5$ and the lengths of the periods $T_1$ to $T_5$ are expressed by the following equations.

$$I_1 = \frac{1}{(L^2 - M^2)}(L+M)V_L T_1 \quad (9)$$

$$I_2 = I_1 + \frac{(LV_1 + MV_L - MV_H)}{(L^2 - M^2)} T_2$$

$$I_3 = I_2 + \frac{V_L}{L} T_3$$

$$I_4 = I_3 + \frac{1}{(L^2 - M^2)}(L+M)V_L T_4$$

$$I_5 = I_4 + \frac{(LV_L - LV_H + MV_L)}{(L^2 - M^2)} T_5 = 0$$

$$T_1 = T_4 = T_D - \frac{T}{2}$$

$$T_2 = T_5$$

$$T_3 = T - T_D - T_2$$

$$\therefore T_2 = -V_L \frac{2L\left(T_D - \frac{T}{2}\right) + (L-M)(T - T_D)}{LV_L - LV_H + MV_L}$$

Hence the U-phase average current $I_{ave}$ for this operating state is calculated in accordance with the following equation.

$$I_{ave} = \qquad (10)$$
$$\frac{1}{T}\left(\frac{1}{2}I_1 T_1 + \frac{1}{2}(I_1 + I_2)T_2 + \frac{1}{2}(I_2 + I_3)T_3 + \frac{1}{2}(I_3 + I_4)T_4 + \frac{1}{2}I_4 T_5\right)$$

The determining condition for this operating state is expressed by the following equations.

$$T_5 \leq T - T_d \Leftrightarrow D < 1 - \frac{V_L}{V_H} \quad (11)$$

$$T_2 > 0$$

$$I_3 > 0$$

Thus, the operating-state determining unit 31 determines whether the condition expressed by (11) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which it operates in discontinuous mode and interaction state I, the duty ratio D is greater than ½, and the U-phase current does not become zero while the U-phase switching element 15 is ON.

The following describes interaction state II. Interaction state II is classified into the case in which the duty ratio D is less than ½, and the case in which the duty ratio D is not less than ½. Further, the case in which the duty ratio D is less than ½ is classified into the case in which the U-phase current becomes zero before the V-phase is turned on, the case in which the U-phase current becomes zero while the V-phase is ON, and the case in which the U-phase current becomes zero after the V-phase switches from ON to OFF. The individual cases will be described in sequence.

Figure 7:
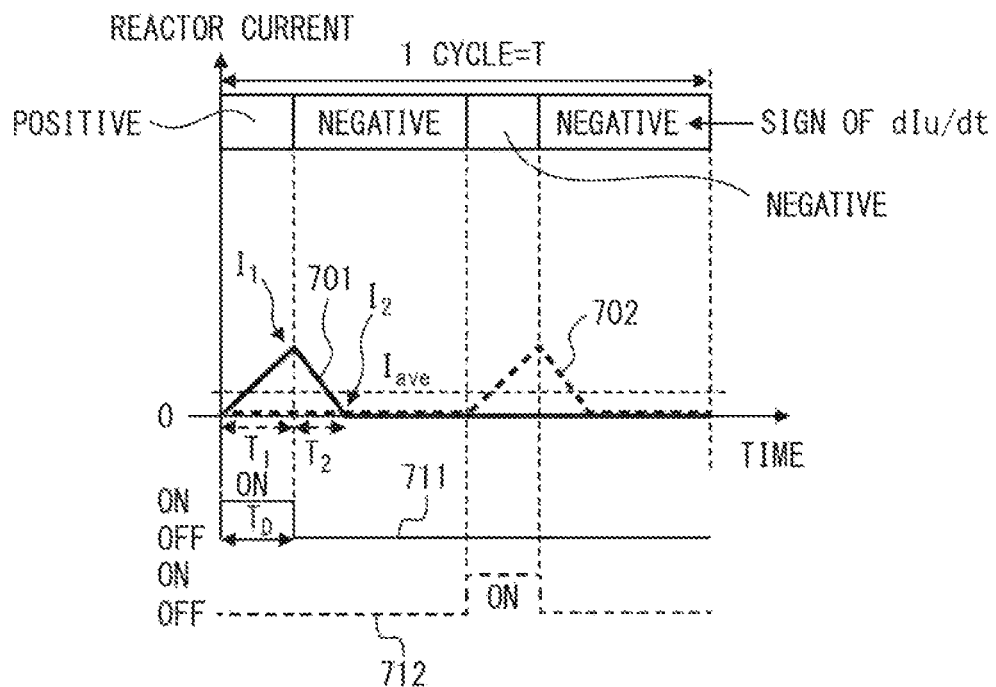
FIG. 7 illustrates an example of the waveforms of reactor currents for still another one of operating states in which the boost converter operates in discontinuous mode.

FIG. 7 illustrates an example of the waveforms of the reactor currents for the case that the operating state is interaction state II, the duty ratio D is less than ½, and the U-phase current becomes zero before the V-phase switches from OFF to ON. In FIG. 7, the abscissa, the ordinate in the upper part, and the ordinate in the lower part represent time, the magnitude of the reactor currents, and the states (ON or OFF) of the switching elements, respectively. Waveforms 701 and 702 represent the waveform of the U-phase current and that of the V-phase current, respectively. Waveforms 711 and 712 represent the change in state of the U-phase switching element 15 and that of the V-phase switching element 16, respectively.

As illustrated by the waveforms 701 and 702, the waveform of the U-phase current for this case is the same as the waveform thereof illustrated in FIG. 4 for the case that the U-phase and the V-phase do not interact. Thus, the operating state of the boost converter 3 in which it operates in discontinuous mode and interaction state II, the duty ratio D is less than ½, and the U-phase current becomes zero before the V-phase is turned on need not be distinguished from the operating state in which it operates in discontinuous mode and the U-phase and the V-phase do not interact. These may be regarded as the same operating state. Thus, when the condition expressed by equation (5) is satisfied, the operating-state determining unit 31 may determine that the operating state of the boost converter 3 is one in which it operates in discontinuous mode and the U-phase and the V-phase do not interact, or one in which it operates in discontinuous mode and interaction state II, the duty ratio D is less than ½, and the U-phase current becomes zero before the V-phase is turned on.

Figure 8:
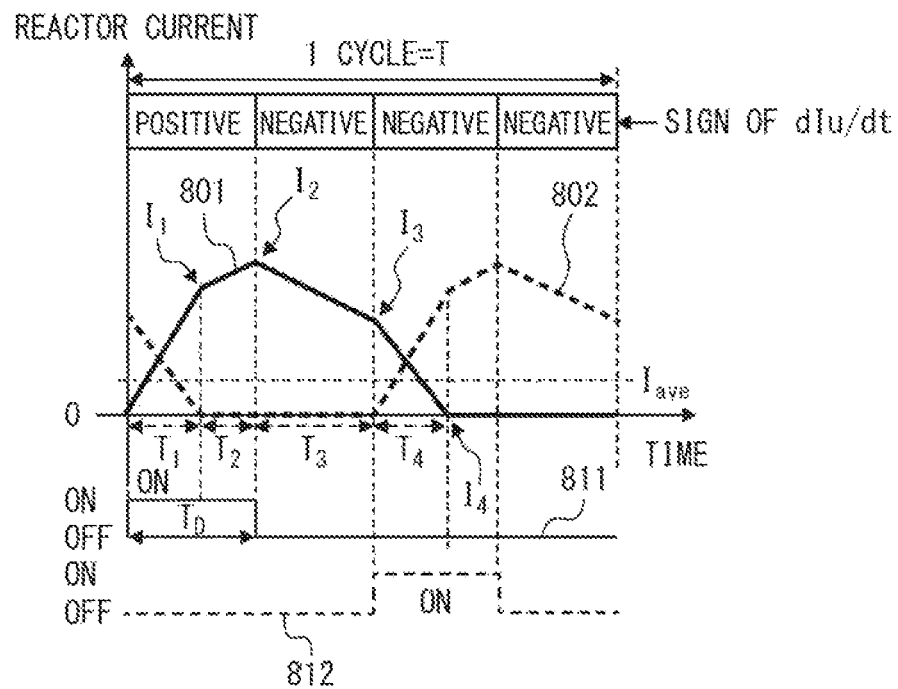
FIG. 8 illustrates an example of the waveforms of reactor currents for still another one of operating states in which the boost converter operates in discontinuous mode.

FIG. 8 illustrates an example of the waveforms of the reactor currents for the case that the operating state is interaction state II, the duty ratio D is less than ½, and the U-phase current becomes zero while the V-phase is on. In FIG. 8, the abscissa, the ordinate in the upper part, and the ordinate in the lower part represent time, the magnitude of the reactor currents, and the states (ON or OFF) of the switching elements, respectively. Waveforms 801 and 802 represent the waveform of the U-phase current and that of the V-phase current, respectively. Waveforms 811 and 812 represent the change in state of the U-phase switching element 15 and that of the V-phase switching element 16, respectively.

As illustrated in FIG. 8, the U-phase is ON and the V-phase is OFF from the start of the switching period T until after the elapse of a period $T_D$. For this reason, the U-phase current increases in this period. In a period $T_1$ that is included in the period $T_D$ and starts concurrently with the switching period T, the U-phase current rapidly increases because the V-phase current decreases. After the elapse of the period $T_1$ from the start of the switching period T, the V-phase current becomes zero, which eliminates interaction between the U-phase and the V-phase, causing the increase in the U-phase current to slow down. After the elapse of a period $T_2$ from the end of the period $T_1$, the U-phase is turned off, and thereafter the U-phase current decreases. After the elapse of a period $T_3$ from the turn-off of the U-phase, i.e., after the elapse of T/2 from the start of the switching period T, the V-phase is turned on, and thereafter the V-phase current increases, in interaction state II, an increase in the V-phase current leads to a decrease in the U-phase current, and thus, in a period $T_4$ that follows the period $T_3$, the U-phase current rapidly decreases while the V-phase current increases. After the elapse of the period $T_4$ from the turn-on of the V-phase, the U-phase current becomes zero. Thus, the U-phase currents $I_1$ to $I_4$ at the ending points of the periods $T_1$ to $T_4$ and the lengths of the periods $T_1$ to $T_4$ are expressed by the following equations.

$$I_1 = \frac{1}{(L^2 - M^2)}(LV_L + MV_L - MV_H)T_1 \quad (12)$$

$$I_2 = I_1 + \frac{V_L}{L}T_2$$

$$I_3 = I_2 + \frac{(V_L - V_H)}{L}T_3$$

$$I_4 = I_3 + \frac{1}{(L^2 - M^2)}(LV_L - LV_H + MV_L)T_4 = 0$$

$$T_1 = T_4$$

$$T_2 = T_D - T_1$$

$$T_3 = \frac{T}{2} - T_D$$

$$\therefore T_1 = \frac{(L-M)\left(\frac{T}{2}(V_H - V_L) - V_H T_D\right)}{LV_L - LV_H + MV_L}$$

Hence the U-phase average current $I_{ave}$ for this operating state is calculated in accordance with the following equation.

$$I_{ave} = \frac{1}{T}\left(\frac{1}{2}I_1 T_1 + \frac{1}{2}(I_1 + I_2)T_2 + \frac{1}{2}(I_2 + I_3)T_3 + \frac{1}{2}I_3 T_4\right) \quad (13)$$

The determining condition for this operating state is expressed by the following equations.

$$T_1 \le T_D \Leftrightarrow D \le \frac{\frac{1}{2}(L-M)(V_H - V_L)}{LV_L + MV_L - MV_H} \Leftrightarrow D \le \frac{\frac{1}{2}(L-M)\left(1 - \frac{V_L}{V_H}\right)}{(L+M)\frac{V_L}{V_H} - M} \quad (14)$$

$$T_1 > 0 \Leftrightarrow D > \frac{1}{2}\left(1 - \frac{V_L}{V_H}\right)$$

Thus, the operating-state determining unit 31 determines whether the condition expressed by (14) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which it operates in discontinuous mode and interaction state II, the duty ratio D is less than ½, and the U-phase current becomes zero while the V-phase is ON.

Figure 9:
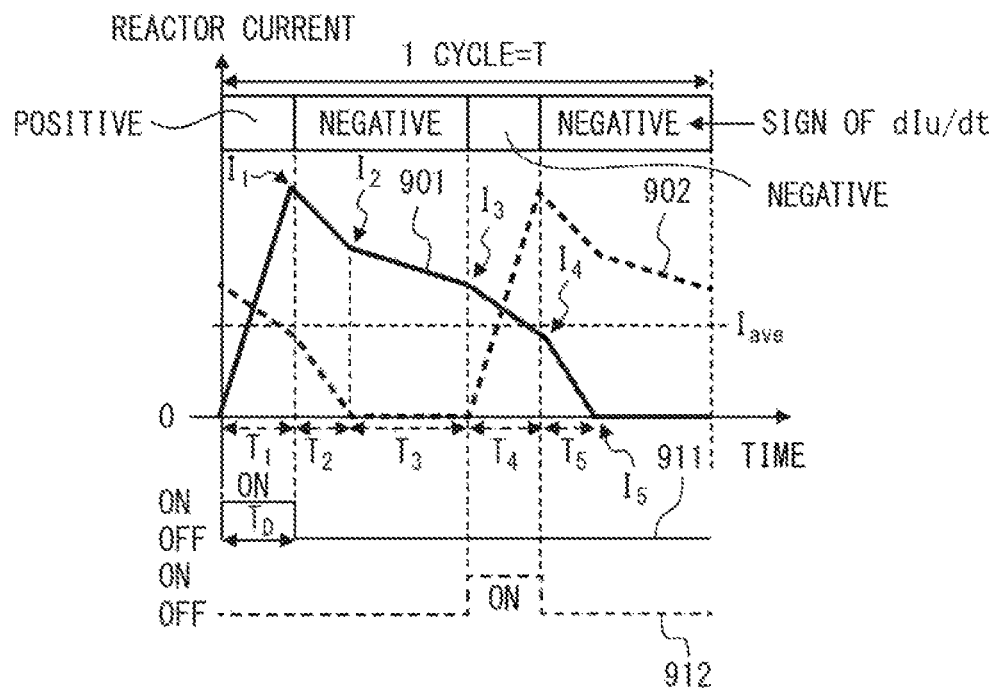
FIG. 9 illustrates an example of the waveforms of reactor currents for still another one of operating states in which the boost converter operates in discontinuous mode.

FIG. 9 illustrates an example of the waveforms of the reactor currents for the case that the operating state is interaction state II, the duty ratio D is less than ½, and the U-phase current becomes zero after the V-phase switches from ON to OFF. In FIG. 9, the abscissa, the ordinate in the upper part, and the ordinate in the lower part represent time, the magnitude of the reactor currents, and the states (ON or OFF) of the switching elements, respectively. Waveforms 901 and 902 represent the waveform of the U-phase current and that of the V-phase current, respectively. Waveforms 911 and 912 represent the change in state of the U-phase switching element 15 and that of the V-phase switching element 16, respectively.

As illustrated in FIG. 9, the U-phase is ON and the V-phase is OFF from the start of the switching period T until after the elapse of a period $T_1$, in interaction state II, the U-phase current increases when the U-phase is ON, and thus, the U-phase current increases whereas the V-phase current decreases. When the period $T_1$ has elapsed, the U-phase is turned off and then the U-phase current starts decreasing. The decrease in the U-phase current affects the V-phase reactor, and thereby the V-phase current also decreases more rapidly. After the elapse of a period $T_2$ from the end of the period $T_1$, the V-phase current becomes zero, and thus the V-phase current does not affect the U-phase reactor after the elapse of the period $T_2$. As a result, the decrease in the U-phase current slows down. After the elapse of a period $T_3$ from when the V-phase current becomes zero, i.e., after the elapse of T/2 from the start of the switching period, the V-phase is turned on and the V-phase current increases, and then the V-phase current affects the U-phase reactor, causing the U-phase current to decrease rapidly. After the elapse of a period $T_4$ from the turn-on of the V-phase, the V-phase is turned off, and thereafter the V-phase current decreases whereas the U-phase current, being affected by the decrease in the V-phase current, decreases more rapidly. After the elapse of a period $T_5$ from the turn-off of the V-phase, the U-phase current becomes zero. Thus, the U-phase currents $I_1$ to $I_5$ at the ending points of the periods $T_1$ to $T_5$ and the lengths of the periods $T_1$ to $T_5$ are expressed by the following equations.

$$I_1 = \frac{1}{(L^2 - M^2)}(LV_L + MV_L - MV_H)T_1 \quad (15)$$

$$I_2 = I_1 + \frac{1}{(L^2 - M^2)}(L + M)(V_L - V_H)T_2$$

$$I_3 = I_2 + \frac{(V_L - V_H)}{L}T_3$$

$$I_4 = I_3 + \frac{1}{(L^2 - M^2)}(LV_L - LV_H + MV_L)T_4$$

$$I_5 = I_4 + \frac{1}{(L^2 - M^2)}(LC_L - LV_H + MV_L)T_5 = 0$$

$$T_1 = T_4 = T_D$$

$$T_2 = T_5$$

$$T_3 = \frac{T}{2} - T_1 - T_2$$

$$\therefore T_2 = \frac{\frac{T}{2}(L-M)(V_L - V_H) - T_D(LV_L + MV_L - MV_H)}{(V_H - V_L)(L+M)}$$

Hence the U-phase average current $I_{ave}$ for this operating state is calculated in accordance with the following equation.

$$I_{ave} = \quad (16)$$

$$\frac{1}{T}\left(\frac{1}{2}I_1 T_1 + \frac{1}{2}(I_1 + I_2)T_2 + \frac{1}{2}(I_2 + I_3)T_3 + \frac{1}{2}(I_3 + I_4)T_4 + \frac{1}{2}I_4 T_5\right)$$

The determining condition for this operating state is expressed by the following equations.

$$T_2 \leq \frac{T}{2} - T_D \Leftrightarrow D \leq 1 - \frac{V_L}{V_H} \quad (17)$$

$$T_2 > 0 \Leftrightarrow D > \frac{\frac{1}{2}(L-M)(V_H - V_L)}{LV_L + MV_L - MV_H} \Leftrightarrow D > \frac{\frac{1}{2}(L-M)\left(1 - \frac{V_L}{V_H}\right)}{(L+M)\frac{V_L}{V_H} - M}$$

Thus, the operating-state determining unit 31 determines whether the condition expressed by (17) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which it operates in discontinuous mode and interaction state II, the duty ratio D is less than ½, and the U-phase current becomes zero after the V-phase switches from ON to OFF.

Figure 10:
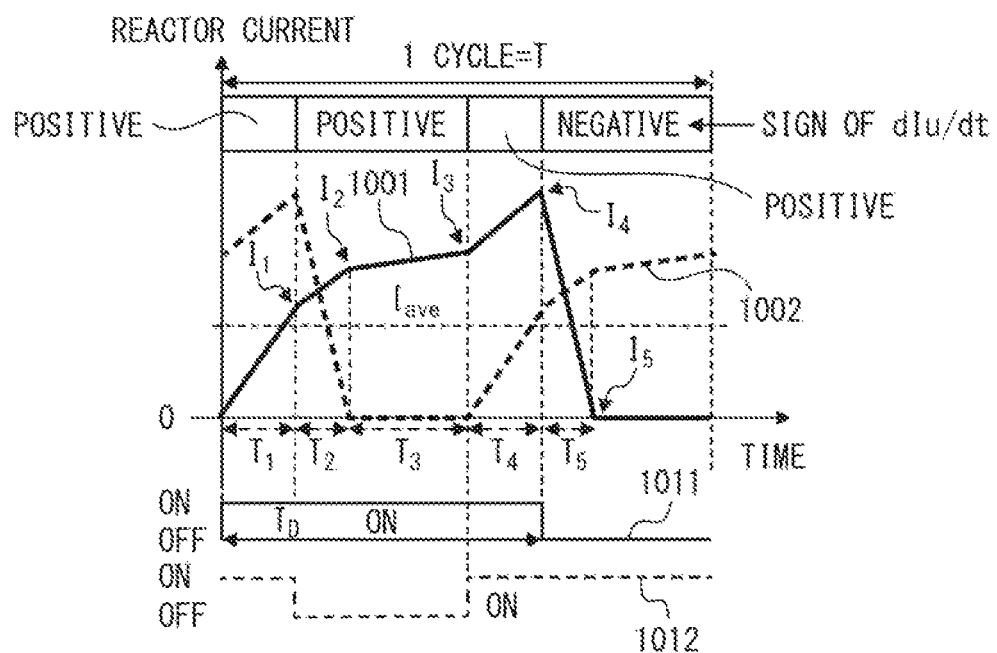
FIG. 10 illustrates an example of the waveforms of reactor currents for still another one of operating states in which the boost converter operates in discontinuous mode.

FIG. 10 illustrates an example of the waveforms of the reactor currents for the case that the operating state is interaction state II and the duty ratio D is not less than ½. In this case, by definition, the timing when the U-phase current becomes zero is constantly in the period during which the V-phase is ON. In FIG. 10, the abscissa, the ordinate in the upper part, and the ordinate in the lower part represent time, the magnitude of the reactor currents, and the states (ON or OFF) of the switching elements, respectively. Waveforms 1001 and 1002 represent the waveform of the U-phase current and that of the V-phase current, respectively. Waveforms 1011 and 1012 represent the change in state of the U-phase switching element 15 and that of the V-phase switching element 16, respectively.

As illustrated in FIG. 10, both the U-phase and the V-phase are ON from the start of the switching period T until after the elapse of a period $T_1$, causing both the U-phase and V-phase currents increase. When the period $T_1$ has elapsed, the V-phase is turned off and then the V-phase current starts decreasing. Additionally, the decrease in the V-phase current affects the U-phase reactor, causing the increase in the U-phase current to slow down. After the elapse of a period $T_2$ from the end of the period $T_1$, the V-phase current becomes zero. Since this eliminates interaction between the U-phase and the V-phase, the increase in the U-phase current further slows down after the elapse of the period $T_2$. After the elapse of a period $T_3$ from when the V-phase current becomes zero, i.e., after the elapse of T/2 from the start of the switching period, the V-phase is turned on and the V-phase current starts increasing, and then the U-phase current, being affected by the increase in the V-phase current, increases more rapidly. After the elapse of a period $T_4$ from the turn-on of the V-phase, the U-phase is turned off, and thereafter the U-phase current decreases whereas the V-phase current, being affected by the decrease in the U-phase current, increases slowly. After the elapse of a period $T_5$ from the turn-off of the U-phase, the U-phase current becomes zero. Thus, the U-phase currents $I_1$ to $I_5$ at the ending points of the periods $T_1$ to $T_5$ and the lengths of the periods $T_1$ to $T_5$ are expressed by the following equations.

$$I_1 = \frac{1}{(L^2 - M^2)}(L + M)V_L T_1 \quad (18)$$

$$I_2 = I_1 + \frac{1}{(L^2 - M^2)}(LV_L + MV_L - MV_H)T_2$$

-continued $$I_3 = I_2 + \frac{V_L}{L}T_3$$

$$I_4 = I_3 + \frac{1}{(L^2 - M^2)}(L+M)V_L T_4$$

$$I_5 = I_4 + \frac{1}{(L^2 - M^2)}(LV_L - LV_H + MV_L)T_5 = 0$$

$$T_1 = T_4 = T_D - \frac{T}{2}$$

$$T_2 = T_5$$

$$T_3 = \frac{T}{2} - T_1 - T_2$$

$$\therefore T_2 = \frac{L(T - 2T_D) - (L - M)(T - T_D)}{LV_L + MV_L - LV_H}V_L$$

Hence the U-phase average current $I_{ave}$ for this operating state is calculated in accordance with the following equation.

$$I_{ave} = \quad (19)$$

$$\frac{1}{T}\left(\frac{1}{2}I_1 T_1 + \frac{1}{2}(I_1 + I_2)T_2 + \frac{1}{2}(I_2 + I_3)T_3 + \frac{1}{2}(I_3 + I_4)T_4 + \frac{1}{2}I_4 T_5\right)$$

The determining condition for this operating state is expressed by the following equations.

$$T_2 \leq T - T_D \Leftrightarrow D \leq 1 - \frac{V_L}{V_H} \quad (20)$$

$$T_2 > 0 \Leftrightarrow D > \frac{M}{L + M}$$

Thus, the operating-state determining unit 31 determines whether the condition expressed by (20) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which it operates in discontinuous mode and interaction state II and the duty ratio D is not less than ½.

The following describes interaction state III. As described above, interaction state III is an operating state in which, when the V-phase switching element is ON, the U-phase current increases regardless of whether the U-phase switching element is ON or OFF, but when the V-phase switching element is OFF, the U-phase current decreases regardless of whether the U-phase switching element is ON or OFF. However, in the present embodiment, the operating state of the boost converter 3 does not become interaction state Ill because the self-inductance L of the reactor 11 is greater than the mutual inductance M.

More specifically, according to the definition of interaction state Ill, when the U-phase is ON and the V-phase is OFF, the U-phase current decreases, but when the V-phase is ON and the U-phase is OFF, the U-phase current $I_u$ increases. Hence, according to equations (1), the following equations hold true.

$$\frac{dI_U}{dt} = \frac{1}{(L^2 - M^2)}(LV_L + MV_L - MV_H) < 0 \quad (21)$$

-continued $$\frac{dI_U}{dt} = \frac{1}{(L^2 - M^2)}(LV_L - LV_H + MV_L) > 0$$

In order for these equations to hold true, the following determining condition needs to be satisfied.

$$\frac{L+M}{M} < \frac{V_H}{V_L} < \frac{L+M}{L} \qquad (22)$$

However, when the self-inductance L is greater than the mutual inductance M, (L+M)/M is greater than (L+M)/L, and thus the condition expressed by equation (22) is not satisfied. Hence the operating state of the boost converter 3 does not become interaction state III. Therefore the operating-state determining unit 31 does not determine that the operating state of the boost converter 3 is interaction state III.

The following describes interaction state IV. In interaction state IV, when the duty ratio D is greater than ½, the U-phase current continues increasing because there is no period during which both the U-phase and the V-phase are OFF. For this reason, when interaction state IV continues, the U-phase current does not become zero, and thus the boost converter 3 cannot maintain its operating state in discontinuous mode and normally operates in continuous mode. Hence it is not necessary to consider the case in which the duty ratio D is greater than ½. The case in which the duty ratio D is not more than ½ is classified into the case in which the U-phase current becomes zero before the V-phase switches from OFF to ON (i.e., before T/2), and the case in which the U-phase current does not become zero before the V-phase switches from OFF to ON. The individual cases will be described in sequence.

Figure 11:
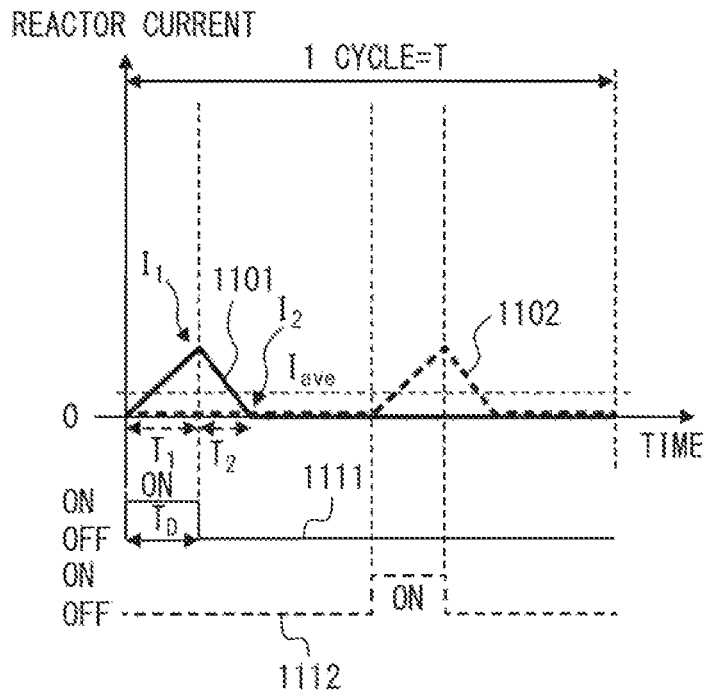
FIG. 11 illustrates an example of the waveforms of reactor currents for still another one of operating states in which the boost convener operates in discontinuous mode.

FIG. 11 illustrates an example of the waveforms of the reactor currents for the case that the operating state is interaction state IV, the duty ratio D is less than 1/2, and the U-phase current becomes zero before the V-phase is turned on. In FIG. 11, the abscissa, the ordinate in the upper part, and the ordinate in the lower part represent time, the magnitude of the reactor currents, and the states (ON or OFF) of the switching elements, respectively. Waveforms 1101 and 1102 represent the waveform of the U-phase current and that of the V-phase current, respectively. Waveforms 1111 and 1112 represent the change in state of the U-phase switching element 15 and that of the V-phase switching element 16, respectively.

As illustrated by the waveforms 1101 and 1102, the waveform of the U-phase current for this case is the same as the waveform thereof illustrated in FIG. 4 for the case that the U-phase and the V-phase do not interact. Thus, the operating state of the boost converter 3 in which it operates in discontinuous mode and interaction state V, the duty ratio D is less than ½, and the U-phase current becomes zero before the V-phase is turned on need not be distinguished from the operating state in which it operates in discontinuous mode and the U-phase and the V-phase do not interact, and the operating state in which it operates in interaction state II, the duty ratio D is less than ½, and the U-phase current becomes zero before the V-phase is turned on. Thus, when the condition expressed by equation (5) is satisfied, the operating-state determining unit 31 may determine that the operating state of the boost converter 3 is one in which it operates in discontinuous mode and the U-phase and the V-phase do not interact, or one in which it operates in discontinuous mode and interaction state II or IV, the duty ratio D is less than ½, and the U-phase current becomes zero before the V-phase is turned on.

Figure 12:
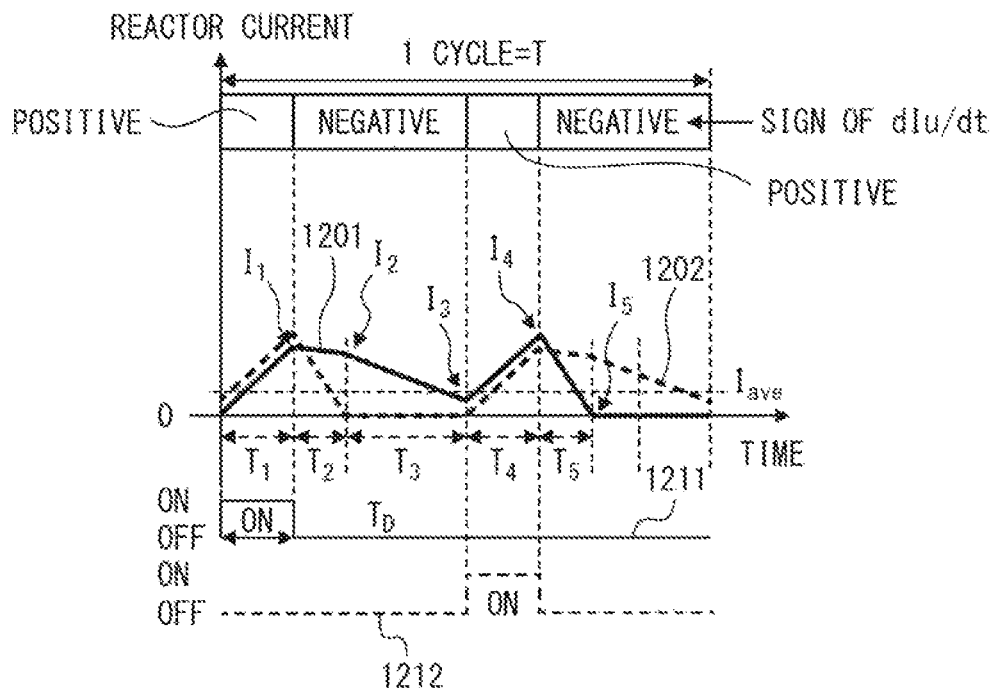
FIG. 12 illustrates an example of the waveforms of reactor currents for still another one of operating states in which the boost converter operates in discontinuous mode.

FIG. 12 illustrates an example of the waveforms of the reactor currents for the case that the operating state is interaction state IV, the duty ratio D is less than ½, and the U-phase current does not become zero before the V-phase is turned on. In FIG. 12, the abscissa, the ordinate in the upper part, and the ordinate in the lower part represent time, the magnitude of the reactor currents, and the states (ON or OFF) of the switching elements, respectively. Waveforms 1201 and 1202 represent the waveform of the U-phase reactor current and that of the V-phase reactor current, respectively. Waveforms 1211 and 1212 represent the change in state of the U-phase switching element 15 and that of the V-phase switching element 16, respectively.

As illustrated in FIG. 12, both the U-phase and the V-phase are ON from the start of the switching period T until after the elapse of a period $T_1$ causing the U-phase current to increase. When the period $T_1$ has elapsed, the U-phase is turned off, and then, since both the U-phase and the V-phase are OFF, the V-phase current starts decreasing and the U-phase current also decreases. After the elapse of a period $T_2$ from the end of the period $T_1$, the V-phase current becomes zero. Thereafter, the V-phase does not affect the U-phase reactor, and thus the decrease in the U-phase current slows down. Ater the elapse of a period T from when the V-phase current becomes zero, i.e., after the elapse of T/2 from the start of the switching period, the V-phase is turned on and the V-phase current increases. In interaction state IV, the U-phase current increases when the U-phase or the V-phase is ON. Thus, in a period $T_4$ that follows the period $T_3$, the increase in the V-phase current affects the U-phase reactor, and thereby the U-phase current also increases. After the elapse of the period $T_4$ from the turn-on of the V-phase, the V-phase is turned off, and thereafter, since both the U-phase and the V-phase are OFF, the U-phase and V-phase currents decrease. After the elapse of a period $T_5$ from the turn-off of the V-phase, the U-phase current becomes zero. Thus, the U-phase currents $I_1$ to $I_5$ at the ending points of the periods $T_1$ to $T_5$ and the lengths of the periods $T_1$ to $T_5$ are expressed by the following equations.

$$I_1 = \frac{1}{(L^2 - M^2)}(LV_L + MV_L - MV_H)T_1 \qquad (23)$$

$$I_2 = I_1 + \frac{(L+M)(V_L - V_H)}{(L^2 - M^2)}T_2$$

$$I_3 = I_2 + \frac{V_L - V_H}{L}T_3$$

$$I_4 = I_3 + \frac{1}{(L^2 - M^2)}(L(V_L - V_H) + MV_L)T_4$$

$$I_5 = I_4 + \frac{(L+M)(V_L - V_H)}{(L^2 - M^2)}T_5 = 0$$

$$T_1 = T_4 = T_D$$

$$T_2 = T_5$$

$$T_3 = \frac{T}{2} - T_1 - T_2$$

$$\therefore T_2 = \frac{L(2V_L - V_H)T_D + (L-M)(V_L - V_H)\left(\frac{T}{2} - T_D\right)}{(L+M)(V_H - V_L)}$$

Hence the U-phase average current $I_{ave}$ for this operating state is calculated in accordance with the following equation.

$$I_{ave} = \frac{1}{T}\left(\frac{1}{2}I_1T_1 + \frac{1}{2}(I_1+I_2)T_2 + \frac{1}{2}(I_2+I_3)T_3 + \frac{1}{2}(I_3+I_4)T_4 + \frac{1}{2}I_4T_5\right) \quad (24)$$

The determining condition for this operating state is expressed by the following equations.

$$T_5 \leq \frac{T}{2} - T_D \Leftrightarrow D < 1 - \frac{V_L}{V_H} \quad (25)$$

$$T_2 > 0 \Leftrightarrow D > \frac{\frac{1}{2}(L-M)(V_H - V_L)}{LV_L + MV_L - MV_H} \Leftrightarrow D > \frac{\frac{1}{2}(L-M)\left(1 - \frac{V_L}{V_H}\right)}{(L+M)\frac{V_L}{V_H} - M}$$

$$I_3 > 0 \Leftrightarrow D > \frac{1}{2}\left(1 - \frac{V_L}{V_H}\right)$$

Thus, the operating-state determining unit 31 determines whether the condition expressed by (25) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which it operates in discontinuous mode and interaction state IV, the duty ratio D is not more than ½, and the U-phase current does not become zero before the V-phase is turned on.

Figures 13, 14:
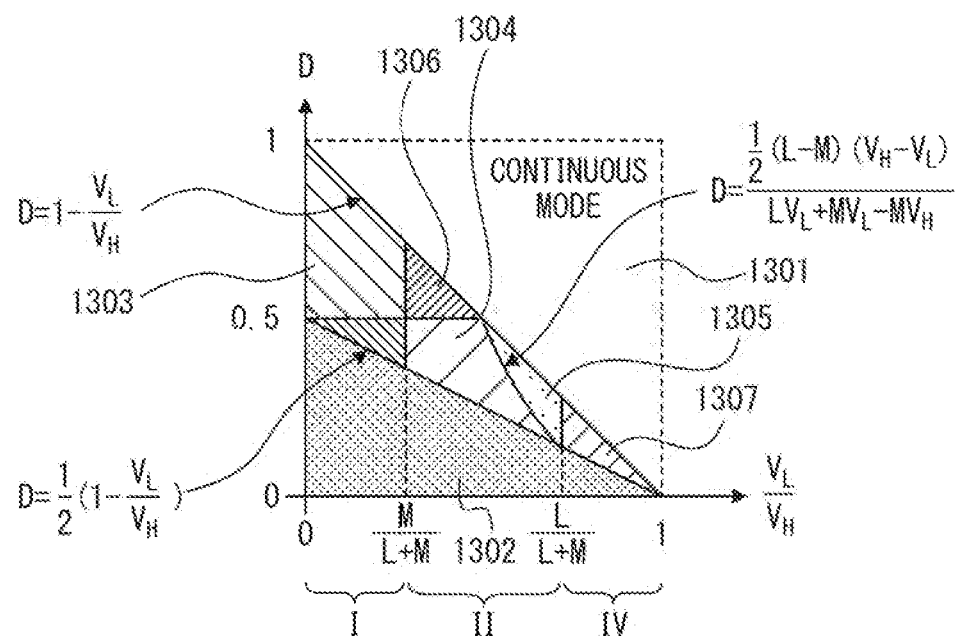
FIG. 13 illustrates the distribution of the operating states as a function of the combination of the ratio of the input voltage into the boost converter to the output voltage therefrom and the duty ratio.
FIG. 14 illustrates a table representing operating points of the boost converter at which a reactor current is measured.

FIG. 13 illustrates the distribution of the operating states as a function of the combination of the ratio $V_L/V_H$ of the input voltage $V_L$ into the boost converter 3 to the output voltage $V_H$ therefrom and the duty ratio D. In FIG. 13, the abscissa and the ordinate represent the ratio $V_L/V_H$ and the duty ratio D, respectively. Each region represents an operating region of the boost converter 3 corresponding to an operating state. More specifically, when the combination of the ratio $V_L/V_H$ and the duty ratio D is included in an operating region 1301, the operating state of the boost converter 3 is one corresponding to continuous mode. When the combination of the ratio $V_L/V_H$ and the duty ratio D is included in an operating region 1302, the operating state of the boost converter 3 is one in which it operates in discontinuous mode and the U-phase and the V-phase do not interact. As described above, this operating state also includes the case in which it operates in discontinuous mode and interaction state II or IV, the duty ratio D is less than ½, and the U-phase current becomes zero before the V-phase is turned on. This operating state will be referred to as "state I" below for the sake of convenience.

When the combination of the ratio $V_L/V_H$ and the duty ratio D is included in an operating region 1303, the operating state of the boost converter 3 is one in which it operates in discontinuous mode and interaction state I, the duty ratio D is greater than ½, and the U-phase current does not become zero while the U-phase switching element 15 is ON. This operating state will be referred to as "state 2" below for the sake of convenience.

When the combination of the ratio $V_L/V_H$ and the duty ratio D is included in an operating region 1304, the operating state of the boost converter 3 is one in which it operates in discontinuous mode and interaction state II, the duty ratio D is less than ½, and the U-phase current becomes zero while the V-phase is ON. This operating state will be referred to as "state 3" below for the sake of convenience.

When the combination of the ratio $V_L/V_H$ and the duty ratio D is included in an operating region 1305, the operating state of the boost converter 3 is one in which it operates in discontinuous mode and interaction state II, the duty ratio D is less than ½, and the U-phase current becomes zero after the V-phase switches from ON to OFF. This operating state will be referred to as "state 4" below for the sake of convenience.

When the combination of the ratio $V_L/V_H$ and the duty ratio D is included in an operating region 1306, the operating state of the boost converter 3 is one in which it operates in discontinuous mode and interaction state II and the duty ratio D is not less than ½. This operating state will be referred to as "state 5" below for the sake of convenience.

When the combination of the ratio $V_L/V_H$ and the duty ratio D is included in an operating region 1307, the operating state of the boost converter 3 is one in which it operates in discontinuous mode and interaction state IV, the duty ratio D is not more than ½, and the U-phase current does not become zero before the V-phase is turned on. This operating state will be referred to as "state 6" below for the sake of convenience.

As described above, the operating-state determining unit 31 can determine the present operating state of the boost converter 3, which is one of possible operating states, based on the self-inductance L, the mutual inductance M, the ratio ($V_L/V_H$) of the input voltage Vi, to the output voltage $V_H$, and the duty ratio D. More specifically, the operating-state determining unit 31 can determine which one of equations (5), (11), (14), (17), (20), and (25) is satisfied to determine the present operating state of the boost converter 3. When none of equations (5), (11), (14), (17), (20), and (25) is satisfied, the boost converter 3 operates in continuous mode, as illustrated in FIG. 13.

When the operating state of the boost converter 3 is one of the operating states in discontinuous mode, the operating-state determining unit 31 calculates the lengths of the periods during which the waveform of the U-phase current is linear and the ending times of the respective periods, depending on the operating state. More specifically, the operating-state determining unit 31 calculates the lengths of the periods $T_1$ to $T_5$ and the ending times of the periods $T_1$ to $T_5$ in accordance with equations (4), (9), (12), (15), (18), or (23) that correspond to the present operating state of the boost converter 3. For example, when the operating state of the boost converter 3 is state I, the operating-state determining unit 31 calculates the lengths of the periods $T_1$ and $T_2$, and the ending times of the periods $T_1$ and $T_2$ in accordance with equations (4).

Every time determining the operating state of the boost converter 3, the operating-state determining unit 31 notifies the operating state to the current measuring unit 32. When the operating state of the boost converter 3 is one of the operating states in discontinuous mode, the operating-state determining unit 31 notifies the current measuring unit 32 of the lengths of the periods during which the waveform of the U-phase current is linear and the ending times of the respective periods for this operating state.

The current measuring unit 32 calculates average currents of the respective phases in the switching period in accordance with the operating state of the boost converter 3 reported from the operating-state determining unit 31.

More specifically, when the boost converter 3 operates in continuous mode, the current measuring unit 32 may regard the values of the reactor currents measured with the ammeters 6 and 7, which are provided for the respective phases, at the midpoints of the periods during which the respective phases are ON as the average currents $I_{ave}$ for the respective phases.

When the operating state of the boost converter 3 is one of the operating states in discontinuous mode, the current measuring unit 32 obtains the values of the reactor current measured with the ammeter 6, which is provided for the U-phase, at the ending times of the respective periods during which the waveform of the U-phase current is linear in the operating state reported from the operating-state determining unit 31. The controller 8 refers to the measurement values of the reactor currents, which are received from the ammeters 6 and 7, at sampling timings of a predetermined sampling period, which is sufficiently shorter than the switching period of the switching elements of the boost converter 3. Thus, the current measuring unit 32 may regard the values of the U-phase reactor current measured at the sampling timings closest to the respective ending times identified as described above, i.e., the ending times of the periods during which the waveform of the U-phase current is linear as the values of the reactor current measured at the ending times of these periods.

The current measuring unit 32 can calculate the average current $I_{ave}$ by substituting the lengths of the periods during which the waveform of the U-phase current is linear and the values of the reactor current measured at the ending times of the respective periods in the operating state of the boost converter 3 together with the input voltage $V_L$, the output voltage $V_H$, the self-inductance L, and the mutual inductance M into the equation for calculating an average current for this operating state. The current measuring unit 32 may use those values of the reactor current at the ending times of the respective periods which are calculated by substituting the input voltage $V_L$, the output voltage $V_H$, the self-inductance L, the mutual inductance M, and the duty ratio D into that equation for calculating the reactor current at these ending times which corresponds to the present operating state of the boost converter 3, instead of the values of the reactor current measured at these ending times. In other words, the current measuring unit 32 can calculate the average current $I_{ave}$ in accordance with equations (4), (10), (13), (16), (19), or (24) that corresponds to the present operating state of the boost converter 3. For example, when the operating state of the boost converter 3 is state I, the current measuring unit 32 may calculate the average current $I_{ave}$ in accordance with equations (4). When the operating state of the boost converter 3 is state 3, the current measuring unit 32 may calculate the average current $I_{ave}$ in accordance with equation (13). In this way, the current measuring unit 32 can obtain an accurate average current $I_{ave}$ in accordance with the waveform of the reactor current in the present operating state of the boost converter 3. Additionally, the current measuring unit 32 need not use all of the values of the reactor current measured at the sampling timings in the switching period, which simplifies the process required to calculate the average current $I_{ave}$.

The current measuring unit 32 can also calculate a V-phase average current in the switching period through a process similar to that for the U-phase. However, since the timing when the U-phase switching element is turned on is shifted by a half of the switching period T from the timing when the V-phase switching element is turned on, the current measuring unit 32 may set the ending times of the respective periods during which the waveform of the V-phase current is linear at the timings shifted by a half of the switching period T from the corresponding timings for the U-phase current.

The following describes experimental results of measurement of a reactor current according to the present embodiment.

FIG. 14 illustrates a table representing operating points of the boost converter 3 at which a reactor current is measured. As illustrated in FIG. 14, each row of the table 1400 represents an operating point of the boost converter 3, a duty ratio D, a voltage ratio $V_L/V_H$ of the input voltage $V_L$ to the output voltage $V_H$, and the operating state including this operating point. For example, at operating point 1, the duty ratio D is 21%, the voltage ratio $V_L/V_H$ is 0.154, and the operating state is state I.

FIGS. 15A to 15F each illustrate a result of calculation of the waveform of a reactor current and a result of measurement of the actual waveform thereof at an operating point represented in FIG. 14. In this experiment, the self-inductance L of the reactors of the respective phases of the boost converter 3 was 115 µH, and the mutual inductance M was 35 µH. The boost converter 3 used for the experiment requires approximately 0.5 µs until a negative reactor current caused by ringing is changed to positive by turn-on of a switching element. This time corresponds to approximately 1% of the value of the duty ratio D. Therefore the values obtained by subtracting 1% from the values of the duty ratio D represented in FIG. 14 were used to calculate the average currents $I_{ave}$.

Figure 15A:
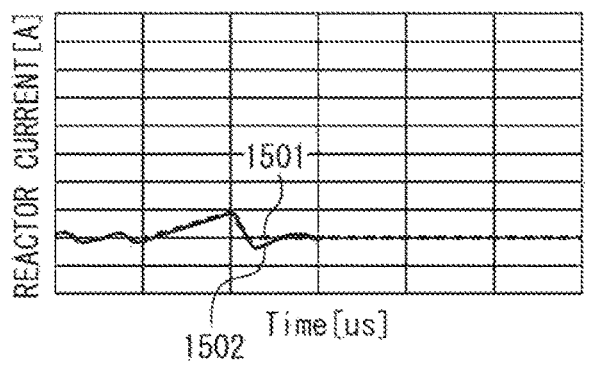
FIGS. 15A to 15F each illustrate a result of calculation of the waveform of a reactor current and a result of measurement of the actual waveform thereof at an operating point represented in FIG. 14.
Figure 15B:
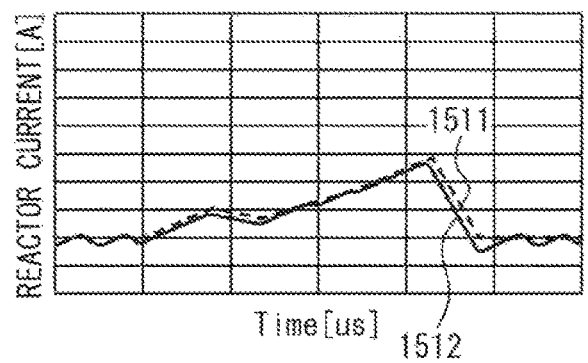
Figure 15C:
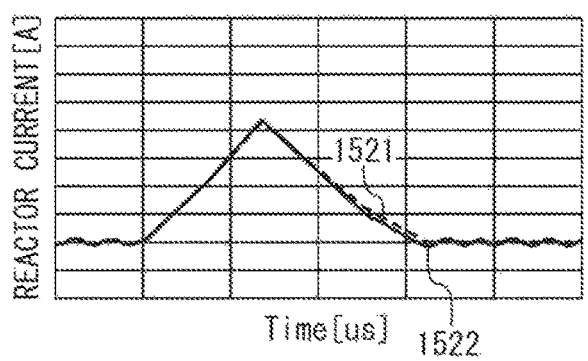
Figure 15D:
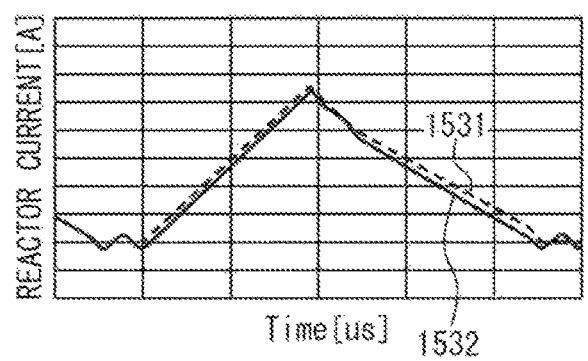
Figure 15E:
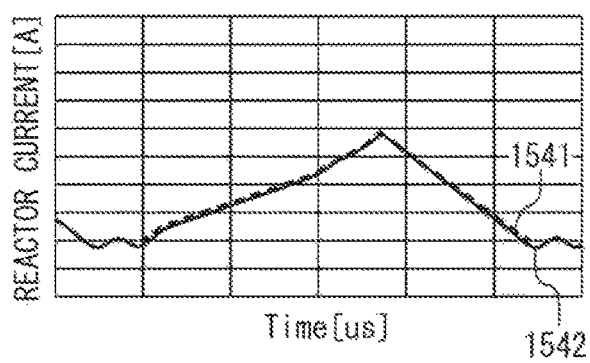
Figure 15F:
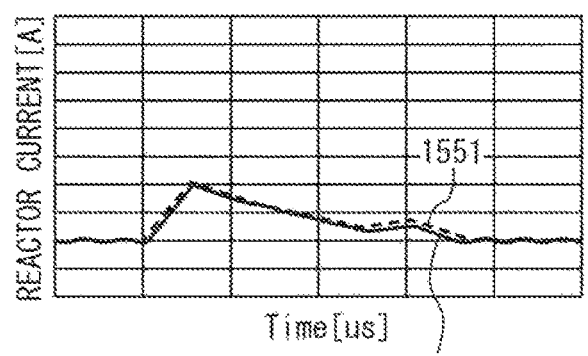

In FIGS. 15A to 15F, the abscissa and the ordinate represent time and the reactor current, respectively. Waveforms 1501 and 1502 in FIG. 15A represent the time-varying changes in the reactor current at operating point 1 obtained by calculation and those measured by experiment, respectively. Waveforms 1511 and 1512 in FIG. 15B represent the time-varying changes in the reactor current at operating point 2 obtained by calculation and those measured by experiment, respectively. Waveforms 1521 and 1522 in FIG. 15C represent the time-varying changes in the reactor current at operating point 3 obtained by calculation and those measured by experiment, respectively. Waveforms 1531 and 1532 in FIG. 15D represent the time-varying changes in the reactor current at operating point 4 obtained by calculation and those measured by experiment, respectively. Waveforms 1541 and 1542 in FIG. 15E represent the time-varying changes in the reactor current at operating point 5 obtained by calculation and those measured by experiment, respectively. Waveforms 1551 and 1552 in FIG. 15F represent the time-varying changes in the reactor current at operating point 6 obtained by calculation and those measured by experiment, respectively.

FIGS. 15A to 15F suggest that the waveforms of the reactor current obtained by calculation favorably agree with the actually measured waveforms thereof at any operating point. This suggests that the average currents $I_{ave}$ in the switching period can be accurately obtained according to the present embodiment.

Every time obtaining the average currents $I_{ave}$ of the respective phases in the switching period, the current measuring unit 32 notifies these average current $I_{ave}$ to the control unit 33.

The control unit 33 controls the boost converter 3, based on the average currents $I_{ave}$ in the switching period received from the current measuring unit 32. For example, the control unit 33 divides a target power value, which is received from another device by the controller 8, by the voltage outputted from the power source 2, i.e., the voltage inputted into the boost converter 3 to calculate a current command value. The control unit 33 then determines the duty ratio corresponding to the current command value by referring to the table, which is prestored in the memory 22, indicating a correspondence between current command values and duty ratios of the switching elements of the respective phases of the boost converter 3. The control unit 33 outputs control signals to the switching elements of the respective phases of the boost converter 3 so that the switching elements of the respective phases may alternately switch between ON and OFF at the determined duty ratio every switching period, thereby controlling the boost converter 3.

The control unit 33 modifies the duty ratio so that the difference between the current command value and each average current $I_{ave}$ in the switching period received from the current measuring unit 32 may decrease, thereby performing feedback control of the boost converter 3. To this end, the control unit 33 may modify the duty ratio in accordance with, for example, proportional control, proportional-plus-integral control, or PID control.

Figure 16:
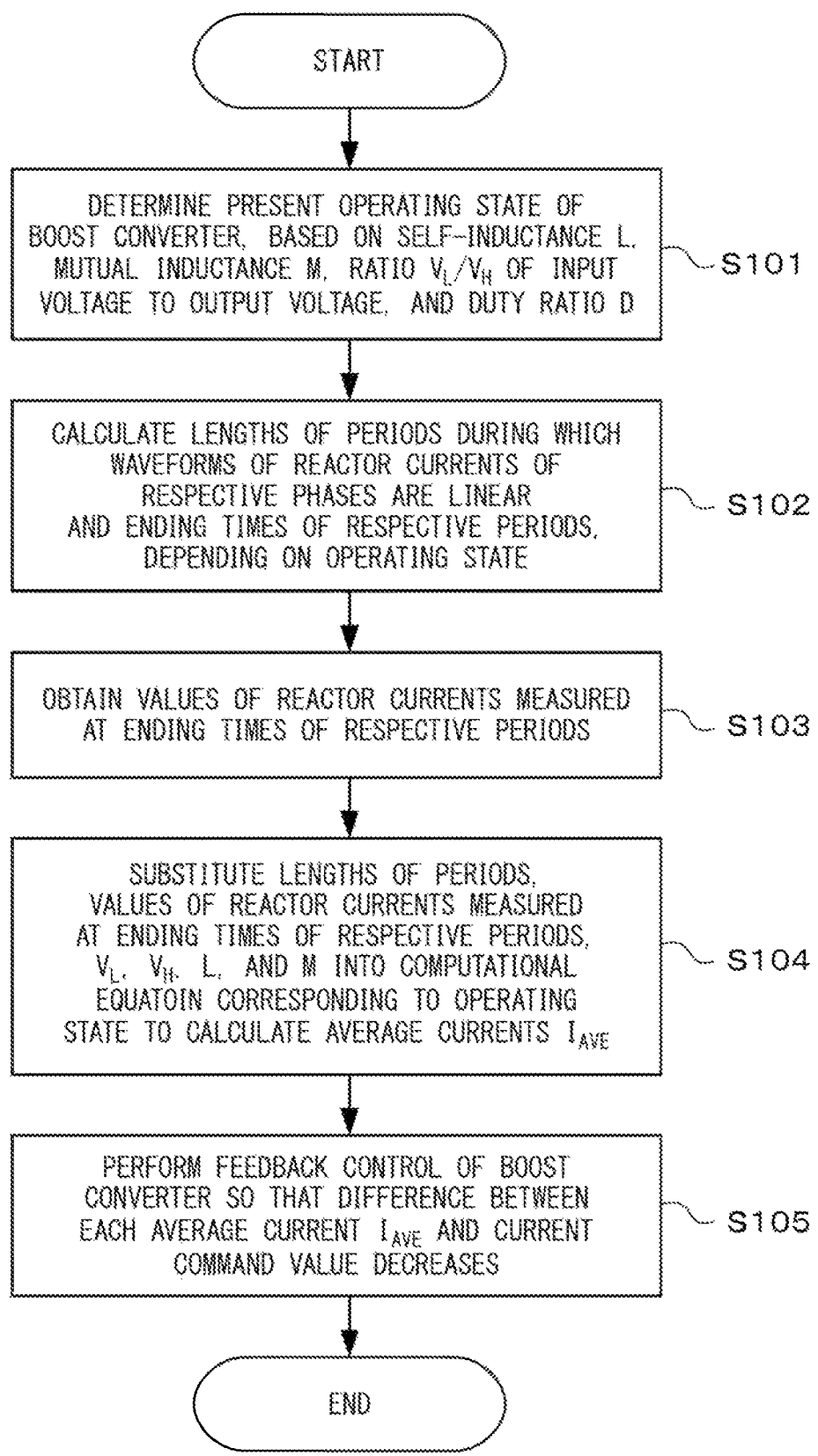
FIG. 16 is an operation flowchart of the process to control the boost converter according to the embodiment including the reactor-current measuring process.

FIG. 16 is an operation flowchart of the process to control the boost converter 3 according to the present embodiment including the reactor-current measuring process. The processor 23 may perform the process to control the boost converter 3 in accordance with the following operation flowchart every predetermined period. Among the steps in the following operation flowchart, the process of steps S101 to S104 is included in the reactor-current measuring process.

The operating-state determining unit 31 of the processor 23 determines the present operating state of the boost converter 3, based on the self-inductance L and the mutual inductance M of the reactors of the respective phases of the boost converter 3, the ratio ($V_L/V_H$) of the input voltage $V_L$ into the boost converter 3 measured with the voltmeter 4 to the output voltage $V_H$ from the boost converter 3 measured with the voltmeter 5, and the duty ratio D applied to the switching elements of the respective phases of the boost converter 3 (step S101)). The operating-state determining unit 31 then calculates the lengths of the periods during which the waveforms of the reactor currents of the respective phases are linear and the ending times of the respective periods, depending on the determined operating state (step S102).

The current measuring unit 32 of the processor 23 obtains, from the ammeters 6 and 7, the values of the reactor currents measured at the ending times of the respective periods during which the waveforms of the reactor currents of the respective phases are linear, depending on the operating state of the boost converter 3 (step S103). The current measuring unit 32 substitutes the lengths of the periods during which the waveforms of the reactor currents of the respective phases are linear, the values of the reactor currents measured at the ending times of the respective periods, the input voltage $V_L$, the output voltage $V_H$, the self-inductance L, and the mutual inductance M into the equation for calculating an average current corresponding to the operating state of the boost converter 3 to calculate average currents $I_{ave}$ of the respective phases (step S104).

The control unit 33 of the processor 23 performs feedback control of the boost converter 3 so that the difference between each calculated average current $I_{ave}$ and the current command value may decrease (step S105). The processor 23 then terminates the process to control the boost converter 3.

As has been described above, the power supply system determines the operating state of a magnetic-coupling boost converter, based on the input and output voltages of the boost converter, the self-inductances and the mutual inductance of reactors of respective phases included in the boost converter, and the duty ratio applied to switching elements of the respective phases of the boost converter. The power supply system then measures averages of reactor currents in the switching period of the switching elements of the respective phases of the boost converter in accordance with the waveforms of the reactor currents corresponding to the determined operating state. For this reason, the power supply system can improve the accuracy of measurement of a reactor current even when the magnetic-coupling boost converter operates in discontinuous mode.

When a magnetic-coupling boost converter operates in discontinuous mode, a current may flow in one of the phases from the output to the input through a body diode of a switching element at a combination of a particular boost ratio and applied duty ratio. Such a current, i.e., a countercurrent is generated because electromotive force caused by magnetic flux from one of the phases exceeds electromotive force in the other phase caused by the electric power supplied from the power source.

In view of this, possible operating states of the boost converter 3 according to a modified example include operating states in which a countercurrent flows. The operating states in which a countercurrent flows include two operating states, i.e., the case in which a switching element is turned on while a countercurrent is flowing, causing a reactor current to increase, and the case in which a reactor current continues decreasing even if a switching element is turned on while a countercurrent is flowing. The following describes these two cases.

Figure 17:
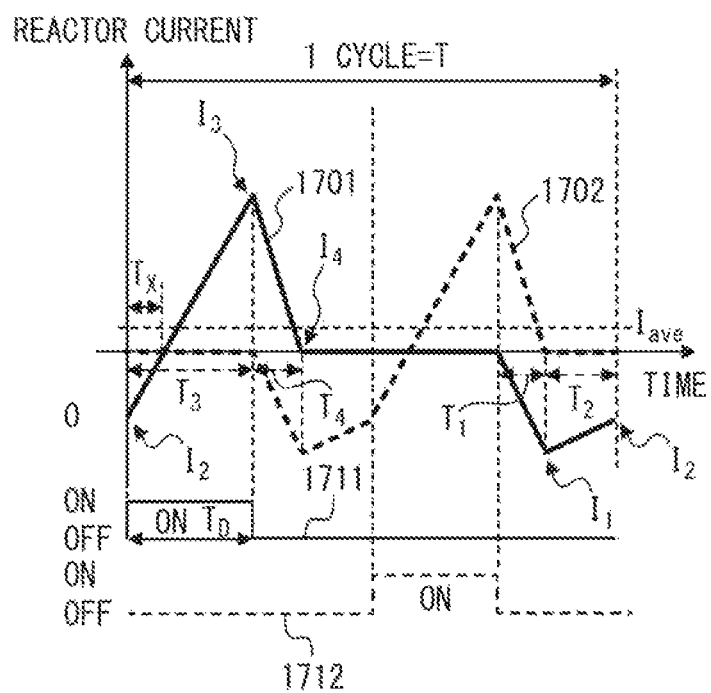
FIG. 17 illustrates an example of the waveforms of reactor currents for one of operating states in which a countercurrent flows through a phase of the boost converter.

FIG. 17 illustrates an example of the waveforms of the reactor currents for the case that a switching element is turned on while a countercurrent is flowing, causing a reactor current to increase. In FIG. 17, the abscissa, the ordinate in the upper part, and the ordinate in the lower part represent time, the magnitude of the reactor currents, and the states (ON or OFF) of the switching elements, respectively. Waveforms 1701 and 1702 represent the waveform of the U-phase current and that of the V-phase current, respectively. Waveforms 1711 and 1712 represent the change in state of the U-phase switching element 15 and that of the V-phase switching element 16, respectively.

As illustrated in FIG. 17, at the start of the switching period T, the U-phase current has a negative value because a countercurrent flows through the U-phase. After the elapse of a period $T_x$ from the start of the switching period T, the U-phase current becomes zero. From the start of the switching period T until after the elapse of a period $T_3$, the U-phase current increases because the U-phase is ON, but the V-phase current is zero because the V-phase is OFF. After the elapse of the period $T_3$, i.e., a period $T_D$ during which the U-phase is ON has elapsed from the start of the switching period T, the U-phase is turned off. For this reason, the U-phase current decreases after the elapse of the period $T_3$. Additionally, electromotive force caused by the decrease in the U-phase current increases a countercurrent flowing through the V-phase. After the elapse of a period $T_4$ from the turn-off of the U-phase, the U-phase current becomes zero and the countercurrent flowing through the V-phase stops increasing. After the end of the period $T_4$, the V-phase countercurrent decreases.

Then, after the elapse of T/2 from the start of the switching period T, the V-phase is turned on, and thereafter the countercurrent flowing through the V-phase decreases more rapidly. The current flowing through the V-phase changes from a countercurrent to a forward current while the V-phase is ON, and the V-phase current increases until the V-phase is turned off. After the elapse of a period $T_D$ from the turn-on of the V-phase, the V-phase is turned off, and thereafter the V-phase current decreases. Additionally, electromotive force caused by the decrease in the V-phase current increases a countercurrent flowing through the U-phase. After the elapse of a period $T_1$ from the turn-off of the V-phase, the V-phase current becomes zero and the countercurrent flowing through the U-phase stops increasing. The U-phase countercurrent decreases during a period $T_2$ that is from the end of the period $T_1$ to the end of the switching period T. Thus, the U-phase currents $I_1$ to $I_4$ at the ending points of the periods $T_1$ to $T_4$ and the lengths of the periods $T_1$ to $T_4$ and $T_x$ are expressed by the following equations.

$$I_1 = \frac{1}{(L^2 - M^2)}(LV_L + MV_L - MV_H)T_1 \quad (26)$$

$$I_2 = I_1 + \frac{V_L}{L}T_2$$

$$I_3 = I_2 + \frac{V_L}{L}T_3$$

$$I_4 = I_3 + \frac{1}{(L^2 - M^2)}(LV_L - LV_H + MV_L)T_4 = 0$$

$$T_1 = T_4$$

$$T_2 = \frac{T}{2} - T_D - T_1$$

$$T_3 = T_D$$

$$T_X = I_2 \times \frac{L}{V_L}$$

$$\therefore T_1 = -V_L T \frac{\frac{1}{2}(L - M)}{LV_L - LV_H + MV_L}$$

Hence the U-phase average current $I_{ave}$ for this operating state is calculated in accordance with the following equation.

$$I_{ave} = \frac{1}{T}\left(\frac{1}{2}I_1 T_1 + \frac{1}{2}(I_1 + I_2)T_2 + \frac{1}{2}I_2 T_X + \frac{1}{2}I_3(T_3 - T_X) + \frac{1}{2}I_3 T_4\right) \quad (27)$$

The determining condition for this operating state is expressed by the following equations.

$$I_1 \leq 0 \Leftrightarrow \frac{V_L}{V_H} \leq \frac{M}{L + M} \quad (28)$$

$$I_2 \leq 0 \Leftrightarrow D > \frac{L}{2(L + M)}$$

$$I_3 > 0 \Leftrightarrow \frac{V_L}{V_H} < \frac{L}{L + M}$$

Thus, the operating-state determining unit 31 determines whether the condition expressed by (28) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost converter 3 is one in which a switching element is turned on while a countercurrent is flowing, causing a reactor current to increase.

Figure 18:
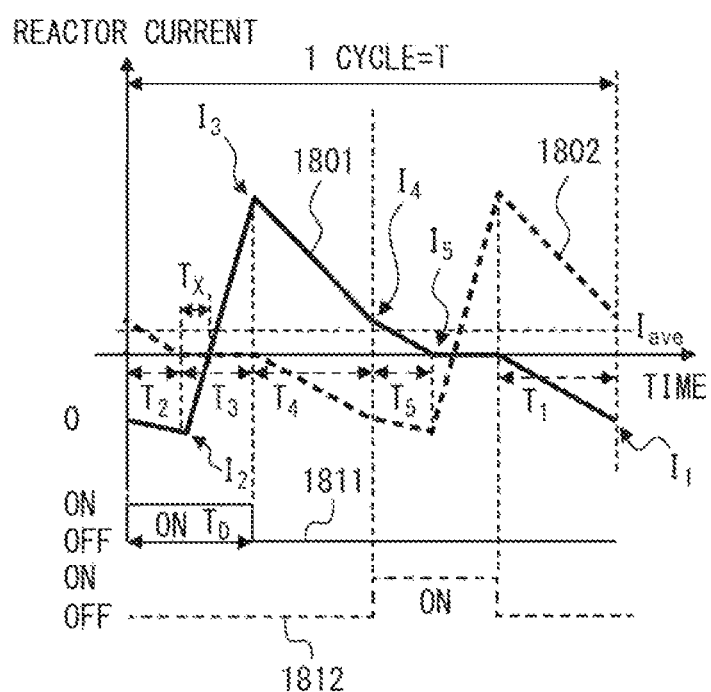
FIG. 18 illustrates an example of the waveforms of reactor currents for another one of operating states in which a countercurrent flows through a phase of the boost converter.

FIG. 18 illustrates an example of the waveforms of the reactor currents for the case that a reactor current decreases even if a switching element is turned on while a countercurrent is flowing. In FIG. 18, the abscissa, the ordinate in the upper part, and the ordinate in the lower part represent time, the magnitude of the reactor currents, and the states (ON or OFF) of the switching elements, respectively. Waveforms 1801 and 1802 represent the waveform of the U-phase current and that of the V-phase current, respectively. Waveforms 1811 and 1812 represent the change in state of the U-phase switching element 15 and that of the V-phase switching element 16, respectively.

As illustrated in FIG. 18, at the start of the switching period T, a countercurrent flowing through the U-phase increases whereas the V-phase current decreases. After the elapse of a period $T_2$ from the start of the switching period T, the V-phase current becomes zero, and thereafter the countercurrent flowing through the U-phase decreases. After the elapse of a period $T_x$ from the end of the period $T_2$, the countercurrent flowing through the U-phase becomes zero. From the end of the period $T_2$ until after the elapse of a period $T_3$, a forward current flowing through the U-phase increases because the U-phase is ON, but the V-phase current is zero because the V-phase is OFF. When the period $T_3$ has elapsed, i.e., a period $T_D$ during which the U-phase is ON has elapsed, the U-phase is turned off. For this reason, the U-phase current decreases in a period $T_4$ that is from the end of the period $T_3$ to turn-on of the V-phase. Additionally, electromotive force caused by the decrease in the U-phase current increases a countercurrent flowing through the V-phase.

Then, after the elapse of the period $T_4$ from the turn-off of the U-phase, i.e., after the elapse of T/2 from the start of the switching period T, the V-phase is turned on, and thereafter the increase in the countercurrent flowing through the V-phase and the decrease in the U-phase current slow down. After the elapse of a period $T_5$ from the turn-on of the V-phase, the U-phase current becomes zero. Thereafter, the current flowing through the V-phase changes from a countercurrent to a forward current while the V-phase is ON, and the V-phase current increases until the V-phase is turned off. After the elapse of a period $T_D$ from the turn-on of the V-phase, the V-phase is turned off, and thereafter the V-phase current decreases. Additionally, electromotive force caused by the decrease in the V-phase current increases a countercurrent flowing through the U-phase. The U-phase countercurrent increases during a period $T_1$ that is from the turn-off of the V-phase to the end of the switching period T. Thus, the U-phase currents $I_1$ to $I_5$ at the ending points of the periods $T_1$ to $T_5$ and the lengths of the periods $T_1$ to $T_5$ and $T_x$ are expressed by the following equations, $$I_1 = \frac{1}{(L^2 - M^2)}(LV_L + MV_L - MV_H)T_1 \quad (29)$$

$$I_2 = I_1 + \frac{(LV_L + MV_L - MV_H)}{(L^2 - M^2)}T_2$$

$$I_3 = I_2 + \frac{V_L}{L}T_3$$

$$I_4 = I_3 + \frac{1}{(L^2 - M^2)}(LV_L - LV_H + MV_L)T_4$$

$$I_5 = I_4 + \frac{1}{(L^2 - M^2)}(LV_L - LV_H + MV_L)T_5 = 0$$

$$T_1 = T_4 = \frac{T}{2} - T_D$$

$$T_2 = T_5$$

-continued $$T_3 = T_D - T_2$$

$$T_X = I_2 \times \frac{L}{V_L}$$

$$\therefore T_2 = T_D - \frac{LT}{2} \times \frac{(2V_L - V_H)}{LV_L - LV_H + MV_L}$$

Hence the U-phase average current $I_{ave}$ for this operating state is calculated in accordance with the following equation.

$$I_{ave} = \frac{1}{T}\left(\frac{1}{2}I_1 T_1 + \frac{1}{2}(I_1 + I_2)T_2 + \right. \quad (30)$$

$$\left. \frac{1}{2}I_2 T_X + \frac{1}{2}I_3(T_3 - T_X) + \frac{1}{2}(I_3 + I_4)T_4 + \frac{1}{2}I_4 T_5\right)$$

The determining condition for this operating state is expressed by the following equations.

$$\frac{V_L}{V_H} \leq \frac{M}{L+M} \quad (31)$$

$$D > \frac{L(2V_L - V_H)}{2(LV_L - LV_H + MV_L)} \Leftrightarrow D > \frac{L\left(2\frac{V_L}{V_H} - 1\right)}{2(L+M)\frac{V_L}{V_H} - 2L}$$

Thus, the operating-state determining unit 31 determines whether the condition expressed by (31) is satisfied, based on the self-inductance L, the mutual inductance M, the ratio ($V_L/V_H$) of the input voltage $V_L$ to the output voltage $V_H$, and the duty ratio D. When this condition is satisfied, the operating-state determining unit 31 may determine that the operating state of the boost convener 3 is one in which a reactor current decreases even if a switching element is turned on while a countercurrent is flowing.

Figure 19:
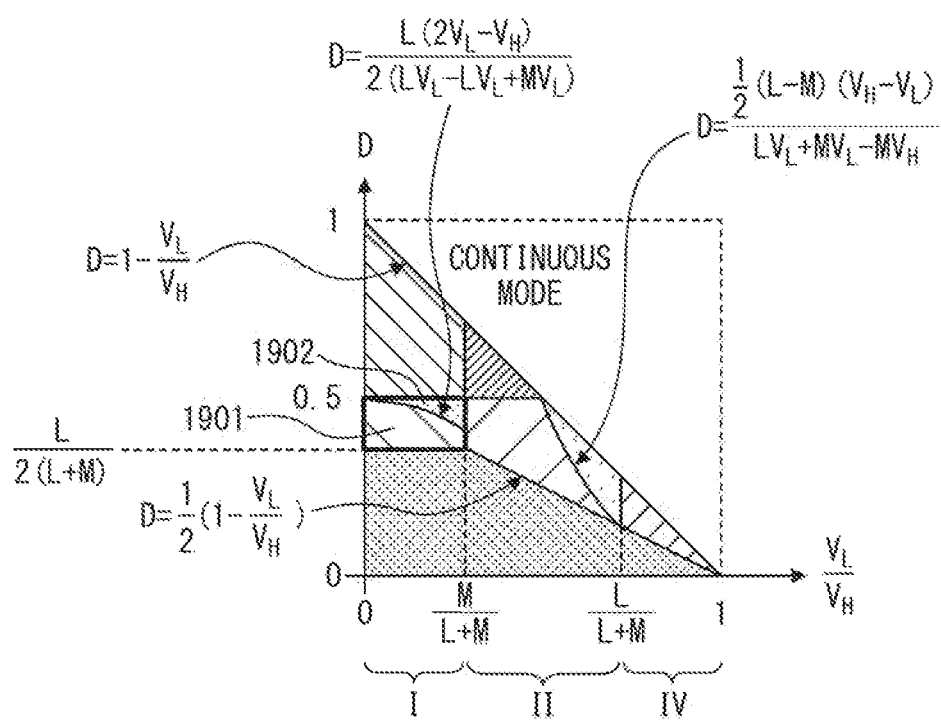
FIG. 19 illustrates the distribution of the operating states according to a modified example as a function of the combination of the ratio of the input voltage into the boost convener to the output voltage therefrom and the duty ratio.

FIG. 19 illustrates the distribution of the operating states according to this modified example as a function of the combination of the ratio $V_L/V_H$ of the input voltage $V_L$ into the boost converter 3 to the output voltage $V_H$ therefrom and the duty ratio D. In FIG. 19, the abscissa and the ordinate represent the ratio $V_L/V_H$ and the duty ratio D, respectively. Each region represents an operating region of the boost converter 3 corresponding to an operating state. The distribution of the operating states according to this modified example differs from that illustrated in FIG. 13 in that operating regions 1901 and 1902 are newly added.

More specifically, when the combination of the ratio $V_L/V_H$ and the duty ratio D is included in an operating region 1901, the operating state of the boost converter 3 is one in which a switching element is turned on while a countercurrent is flowing, causing a reactor current to increase.

When the combination of the ratio $V_L/V_H$ and the duty ratio D is included in an operating region 1902, the operating state of the boost converter 3 is one in which a reactor current decreases even if a switching element is turned on while a countercurrent is flowing.

In this modified example also, the operating-state determining unit 31 may determine the operating state of the boost converter 3, based on the self-inductance L, the mutual inductance M, the ratio ($V_L/V_H$) of the input voltage $V_L$ to the output voltage $V_H$, and the duty ratio D. As in the embodiment, the current measuring unit 32 may calculate the average current $I_{ave}$ by substituting the lengths of the periods during which the waveform of the U-phase current is linear and the values of the reactor current measured at the ending times of the respective periods in the operating state of the boost converter 3 together with the input voltage $V_L$, the output voltage $V_H$, the self-inductance L, and the mutual inductance M into the equation for calculating an average current for this operating state.

According to this modified example, the power supply system can accurately measure a reactor current even when a countercurrent flows through one of the phases of a boost converter.

According to another modified example, the memory 22 may prestore a reference table indicating the relationship between reference values of each average current and combinations of the input voltage $V_L$ into the boost converter 3, the output voltage $V_H$ from the boost converter 3, and the duty ratio D, for each of the operating states. The reference values of each average current, which are included in the reference table and correspond to the combinations of the input voltage $V_L$, the output voltage $V_H$, and the duty ratio D, may be values measured in advance, for example, in accordance with the above-described technique, or values obtained by simulation or calculation.

In this case, the current measuring unit 32 loads, from the memory 22, the reference table corresponding to the operating state reported from the operating-state determining unit 31, and refers to the loaded reference table to identify the reference value of each average current corresponding to the combination of the input voltage $V_L$, the output voltage $V_H$, and the duty ratio D. The current measuring unit 32 may use the identified reference value as a measured average current $I_{ave}$. Hence the ammeters 6 and 7 may be omitted in this modified example. According to this modified example, the power supply system can be simplified.

According to another modified example, the reference table prepared for each operating state of the boost converter 3 may include offset values respectively corresponding to combinations of the input voltage $V_L$, the output voltage $V_H$, and the duty ratio D. Each of the offset values is the difference between the value of an average current calculated as in the embodiment and the value of a reactor current at a predetermined timing in the switching period, e.g., at the midpoint of a period during which a switching element of one of the phases is ON. In this case, the current measuring unit 32 loads, from the memory 22, the reference table corresponding to the operating state reported from the operating-state determining unit 31, and refers to the loaded reference table to identify the offset value corresponding to the combination of the input voltage $V_L$, the output voltage $V_H$, and the duty ratio D. The current measuring unit 32 may obtain a measurement value of each average current $I_{ave}$ in the switching period by adding the identified offset value to the value of the reactor current measured with an ammeter at the predetermined timing in the switching period.

According to this modified example, the current measuring unit 32 can obtain the average of a reactor current in the switching period by referring to a single measurement value of the reactor current in each switching period. Thus, according to this modified example, the current measuring unit 32 can obtain an accurate average current through a simplified process to measure the average current.

In the above-described embodiment and modified examples, the U-phase and the V-phase are the same except that the timings when the respective switching elements are turned on are shifted by ½ of the switching period. Thus, according to still another modified example, the current measuring unit 32 may measure the average of the reactor current in the switching period for only one of the phases, i.e., the U-phase or the V-phase in accordance with the embodiment or one of the modified examples. The current measuring unit 32 may assume that the average of the reactor current of the other phase in the switching period is the same as the measured average of the reactor current of the one of the phases. This further simplifies the process performed by the current measuring unit 32.

According to yet another modified example, those average currents $I_{ave}$ of the respective phases in the switching period which are obtained by the current measuring unit 32 may be used for a purpose other than control of the boost converter 3. For example, the processor 23 may use the average currents $I_{ave}$ for calculating the electric power supplied from the power source 2. More specifically, the processor 23 can calculate the electric power supplied from the power source 2 by multiplying the voltage outputted from the power source 2 by the average currents $I_{ave}$.

As described above, those skilled in the art may make various modifications according to embodiments within the scope of the present invention.

What is claimed is:

1. A power supply system comprising:
   a power source that supplies a direct-current power;
   a boost converter that boosts direct-current power supplied from the power source;
   a first voltmeter that measures an input voltage inputted into the boost converter;
   a second voltmeter that measures an output voltage outputted from the boost converter; and
   a control device that controls the boost converter, wherein the boost converter comprises:
      a first reactor and a second reactor connected in parallel to the power source and being able to be magnetically coupled with each other;
      a first switching element connected to one end of the first reactor that is opposite to an end of the first reactor connected to the power source; and
      a second switching element connected to one end of the second reactor that is opposite to an end of the second reactor connected to the power source, and
   wherein
   the control device comprises:
      a memory configured to store a self-inductance of the first reactor and the second reactor and a mutual inductance between the first reactor and the second reactor; and
      a processor configured to switch between ON and OFF of the first switching element and the second switching element alternately at a predetermined duty ratio every predetermined switching period,
         determine a present operating state of the boost converter, based on a ratio of the input voltage to the output voltage, the duty ratio, the self-inductance, and the mutual inductance, the present operating state being one of operating states among which the waveform of a reactor current flowing through the first reactor or the second reactor in the switching period differs, and
         measure an average of the reactor current in the switching period, based on the input voltage, the output voltage, and the duty ratio, in accordance with the waveform of the reactor current corresponding to the present operating state of the boost converter.

2. The power supply system according to claim 1, further comprising an ammeter that measures the reactor current, wherein
   the memory further stores, for each of the operating states, offset values respectively corresponding to combinations of the input voltage, the output voltage, and the duty ratio, each of the offset values being a difference between a value of the reactor current at a predetermined timing in the switching period and the average of the reactor current, and
   the processor adds one of the offset values corresponding to a combination of the input voltage, the output voltage, and the duty ratio of the present operating state of the boost converter to a value of the reactor current measured at the predetermined timing to measure the average of the reactor current.

3. The power supply system according to claim 1, wherein the memory further stores, for each of the operating states, reference values of the average of the reactor current respectively corresponding to combinations of the input voltage, the output voltage, and the duty ratio, and
   the processor obtains, as the average of the reactor current, the reference value of the average of the reactor current corresponding to a combination of the input voltage, the output voltage, and the duty ratio of the present operating state of the boost converter.

4. The power supply system according to claim 1, wherein the waveform of the reactor current for each of the operating states depends on presence or absence of interaction between the first reactor and the second reactor and on increases or decreases in the reactor current depending on combinations of ON and OFF of the first switching element and the second switching element, the increases or decreases being caused by the interaction, and
   the processor determines whether determining conditions respectively corresponding to the waveforms of the reactor current for the respective operating states are satisfied, based on the ratio of the input voltage to the output voltage, the duty ratio, the self-inductance, and the mutual inductance, and determines an operating state whose determining condition is satisfied as the present operating state of the boost converter.

5. A control device for controlling a boost converter that boosts direct-current power supplied from a power source, wherein
   the boost converter comprises:
      a first reactor and a second reactor connected in parallel to the power source and being able to be magnetically coupled with each other;
      a first switching element connected to one end of the first reactor that is opposite to an end of the first reactor connected to the power source; and
      a second switching element connected to one end of the second reactor that is opposite to an end of the second reactor connected to the power source, and
   wherein
   the control device comprises:
      a memory configured to store a self-inductance of the first reactor and the second reactor and a mutual inductance between the first reactor and the second reactor; and
      a processor configured to switch between ON and OFF of the first switching element and the second switching element alternately at a predetermined duty ratio every predetermined switching period,
         determine a present operating state of the boost converter, based on a ratio of an input voltage into the boost converter to an output voltage from the boost converter, the duty ratio, the self-inductance, and the mutual inductance, the input voltage and the output voltage being measured with a first voltmeter and a second voltmeter, respectively, and the present operating state being one of operating states among which the waveform of a reactor current flowing through the first reactor or the second reactor in the switching period differs, and measure an average of the reactor current in the switching period, based on the input voltage, the output voltage, and the duty ratio, in accordance with the waveform of the reactor current corresponding to the present operating state of the boost converter.

6. A method for measuring a reactor current in a boost converter comprising a first reactor, a second reactor, a first switching element, and a second switching element, the first reactor and the second reactor being connected in parallel to a power source supplying a direct-current power and being able to be magnetically coupled with each other, the first switching element being connected to one end of the first reactor that is opposite to an end of the first reactor connected to the power source, the second switching element being connected to one end of the second reactor that is opposite to an end of the second reactor connected to the power source, the reactor current flowing through the first reactor or the second reactor, the method comprising:

obtaining a value of an input voltage inputted into the boost converter, the value being measured with a first voltmeter;

obtaining a value of an output voltage outputted from the boost converter, the value being measured with a second voltmeter;

determining a present operating state of the boost converter, based on a ratio of the input voltage to the output voltage, a predetermined duty ratio, a self-inductance of the first reactor and the second reactor, and a mutual inductance between the first reactor and the second reactor, wherein ON and OFF of the first switching element and the second switching element are switched alternately at the duty ratio during a predetermined switching period, and the present operating state is one of operating states among which the waveform of the reactor current in the switching period differs; and measuring an average of the reactor current in the switching period, based on the input voltage, the output voltage, and the duty ratio, in accordance with the waveform of the reactor current corresponding to the present operating state of the boost converter.

* * * * *